(12) United States Patent
Visenzi

(10) Patent No.: US 9,650,096 B2
(45) Date of Patent: May 16, 2017

(54) CASE FOR MOTORCYCLES

(71) Applicant: GIVI S.r.l., Flero (BS) (IT)

(72) Inventor: Vincenzo Visenzi, Brescia (IT)

(73) Assignee: GIVI S.R.L., Flero (BS) (IT)

( * ) Notice: Subject to any disclaimer, the term of this patent is extended or adjusted under 35 U.S.C. 154(b) by 154 days.

(21) Appl. No.: 14/419,555

(22) PCT Filed: Aug. 6, 2013

(86) PCT No.: PCT/IB2013/056445
§ 371 (c)(1),
(2) Date: Feb. 4, 2015

(87) PCT Pub. No.: WO2014/024141
PCT Pub. Date: Feb. 13, 2014

(65) Prior Publication Data
US 2015/0191210 A1 Jul. 9, 2015

(30) Foreign Application Priority Data

Aug. 7, 2012 (IT) .............................. MI2012A1405
Dec. 11, 2012 (IT) .............................. MI20120436 U

(51) Int. Cl.
*B60R 9/10* (2006.01)
*B62J 9/00* (2006.01)
*E05B 65/52* (2006.01)

(52) U.S. Cl.
CPC ................ *B62J 9/00* (2013.01); *B62J 9/001* (2013.01); *E05B 65/52* (2013.01); *Y10T 70/5031* (2015.04)

(58) Field of Classification Search
CPC ...... B62J 7/00; B62J 9/00; B62J 9/001; B60R 9/10; B62H 3/00

(Continued)

(56) References Cited

U.S. PATENT DOCUMENTS 3,275,336 A * 9/1966 Warner, Jr. ............ A45C 5/145
  16/405
4,266,703 A * 5/1981 Litz .......................... B62J 9/001
  224/413

(Continued)

FOREIGN PATENT DOCUMENTS

CN 2343057 Y 10/1999
DE 42 30 972 A1 5/1993

(Continued)

OTHER PUBLICATIONS

Chinese Office Action, issued Sep. 1, 2016 (9 pages).

*Primary Examiner* — Brian D Nash
(74) *Attorney, Agent, or Firm* — Jacobson Holman, PLLC.

(57) ABSTRACT

A case for motorcycles comprises a base portion, a cover, hinged to such a base portion, and a supporting structure, constrainable on one side to the base portion and, on the opposite side, to a fixed structure of the motorcycle. On the base portion a lock mechanism with a key is permanently constrained, operatively connected to the cover. The case is provided with first releasable engaging means between the base portion and the cover and second releasable engaging means between such a base portion and the supporting structure. The second releasable engaging means are made integral to the base portion. Both the first engaging means, and the second engaging means are simultaneously released by the key of the lock mechanism in order to selectively obtain the opening of the cover with respect to the base portion and/or the disengagement of such a base portion with respect to the supporting structure.

20 Claims, 27 Drawing Sheets

(58) Field of Classification Search
USPC .................................... 224/435, 433, 423
See application file for complete search history.

(56) References Cited

U.S. PATENT DOCUMENTS

| | | | | |
|---|---|---|---|---|
| 4,509,622 A * | 4/1985 | Morszeck | ............... | A45C 5/03 190/119 |
| 4,588,114 A * | 5/1986 | Lebaron | ............... | B62J 9/00 224/413 |
| 4,782,673 A * | 11/1988 | Castelli | ............... | E05C 19/14 292/113 |
| 5,060,492 A * | 10/1991 | Carpenter | ............... | E05B 65/52 292/113 |
| 5,114,060 A * | 5/1992 | Boyer | ............... | B62J 7/06 224/413 |
| 5,351,509 A * | 10/1994 | Visenzi | ............... | A45C 13/18 70/159 |
| 5,461,892 A * | 10/1995 | Hsieh | ............... | E05C 19/145 292/247 |
| 5,924,533 A * | 7/1999 | Cnockaert | ............... | A45C 5/03 190/109 |
| 6,203,075 B1 * | 3/2001 | Wells, Jr. | ............... | B65D 45/24 292/100 |
| 6,367,603 B1 * | 4/2002 | Tiramani | ............... | A45C 5/02 190/100 |
| 6,499,784 B2 * | 12/2002 | Takahashi | ............... | B62K 11/10 224/413 |
| 6,840,417 B2 * | 1/2005 | Heinrich | ............... | B62J 9/00 224/413 |
| 6,955,381 B2 * | 10/2005 | Parker | ............... | A45C 13/1084 292/113 |
| 7,628,120 B2 * | 12/2009 | Beeler | ............... | B62J 9/001 119/482 |
| 7,963,379 B2 * | 6/2011 | Roth | ............... | B62J 9/00 190/100 |
| 8,297,464 B2 * | 10/2012 | Grenier | ............... | A45C 13/1084 220/314 |
| 8,646,669 B2 * | 2/2014 | Mann | ............... | B62J 25/00 224/413 |
| 8,752,745 B2 * | 6/2014 | Bond | ............... | B62J 9/00 206/317 |
| 9,199,370 B2 * | 12/2015 | Crull | ............... | B65D 25/28 |
| 2006/0220406 A1 | 10/2006 | Misaki et al. | | |
| 2008/0116696 A1 * | 5/2008 | Schmitt | ............... | E05B 17/2053 292/122 |
| 2010/0065596 A1 * | 3/2010 | Lim | ............... | B62H 5/001 224/413 |
| 2010/0077804 A1 * | 4/2010 | Takeuchi | ............... | B62J 9/001 70/57.1 |
| 2010/0077807 A1 * | 4/2010 | Takeuchi | ............... | B60R 11/00 70/158 |
| 2011/0233247 A1 * | 9/2011 | Kanazawa | ............... | B62J 9/001 224/413 |

FOREIGN PATENT DOCUMENTS

| | | |
|---|---|---|
| EP | 0517265 A2 | 12/1992 |
| EP | 1063157 A1 | 12/2000 |
| EP | 1369344 A1 | 12/2003 |
| EP | 1661799 A1 | 5/2006 |
| JP | 2003-072620 A | 3/2003 |
| WO | 01/12496 A1 | 2/2001 |
| WO | 2007/045371 A1 | 4/2007 |

* cited by examiner

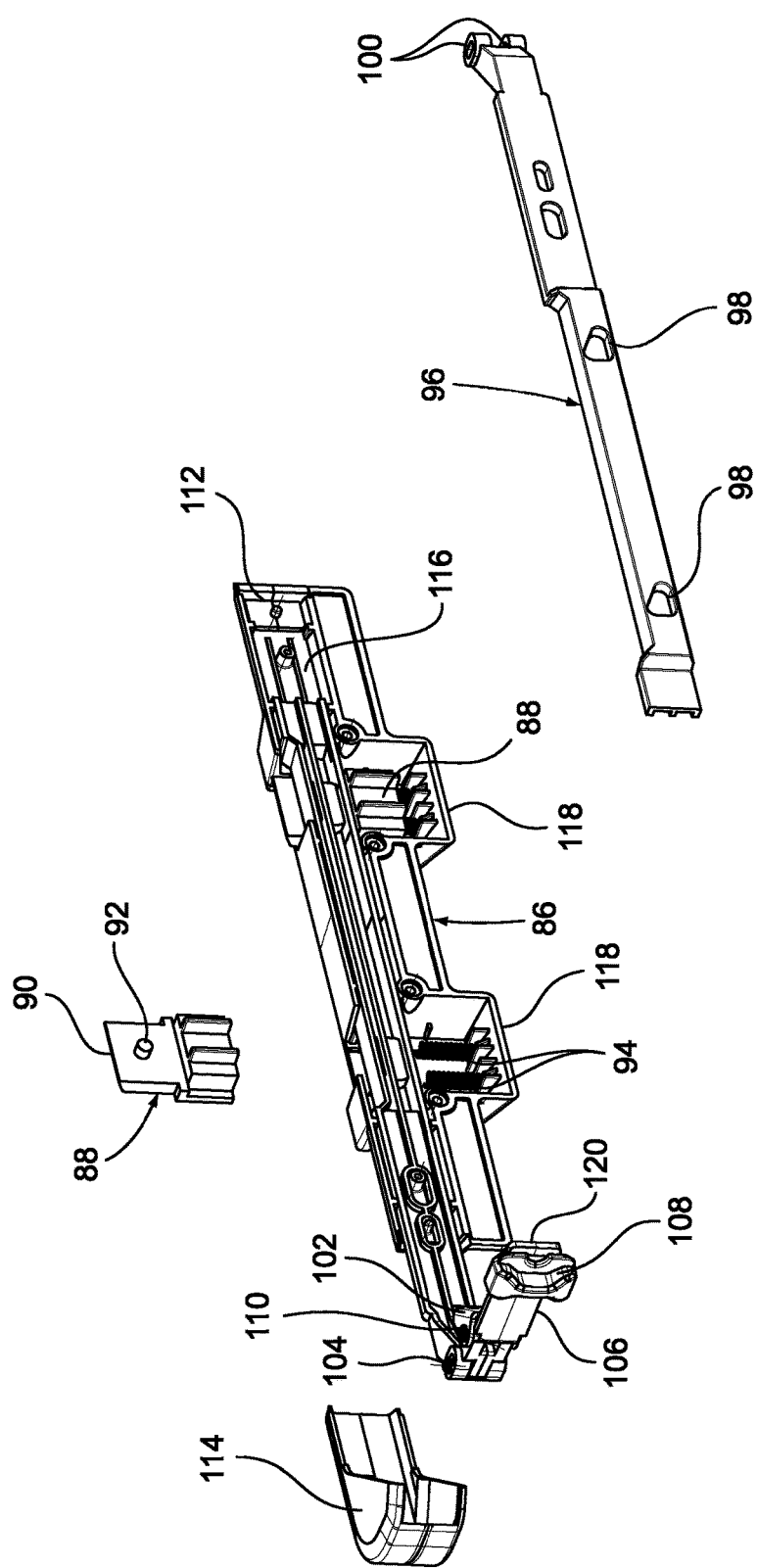

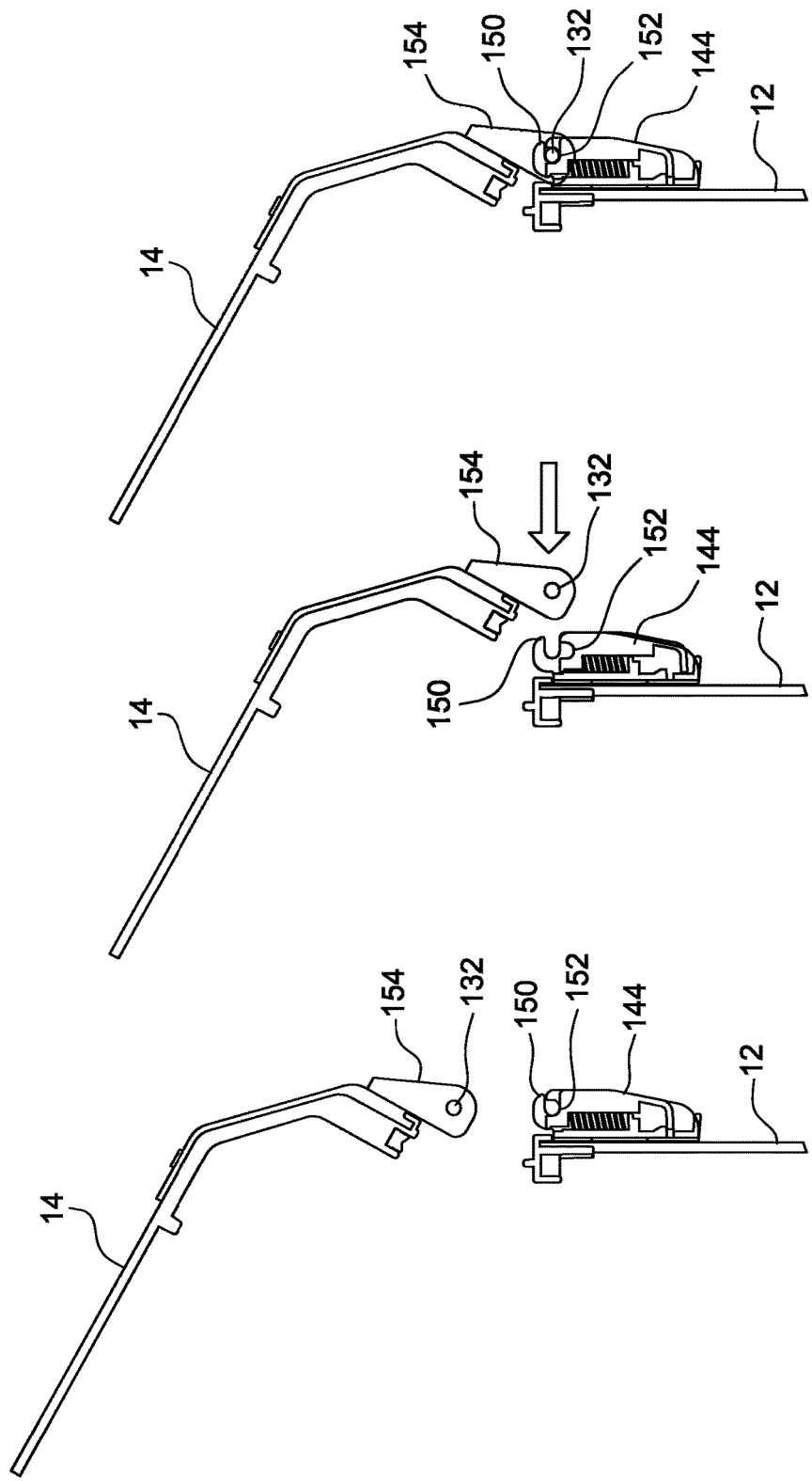

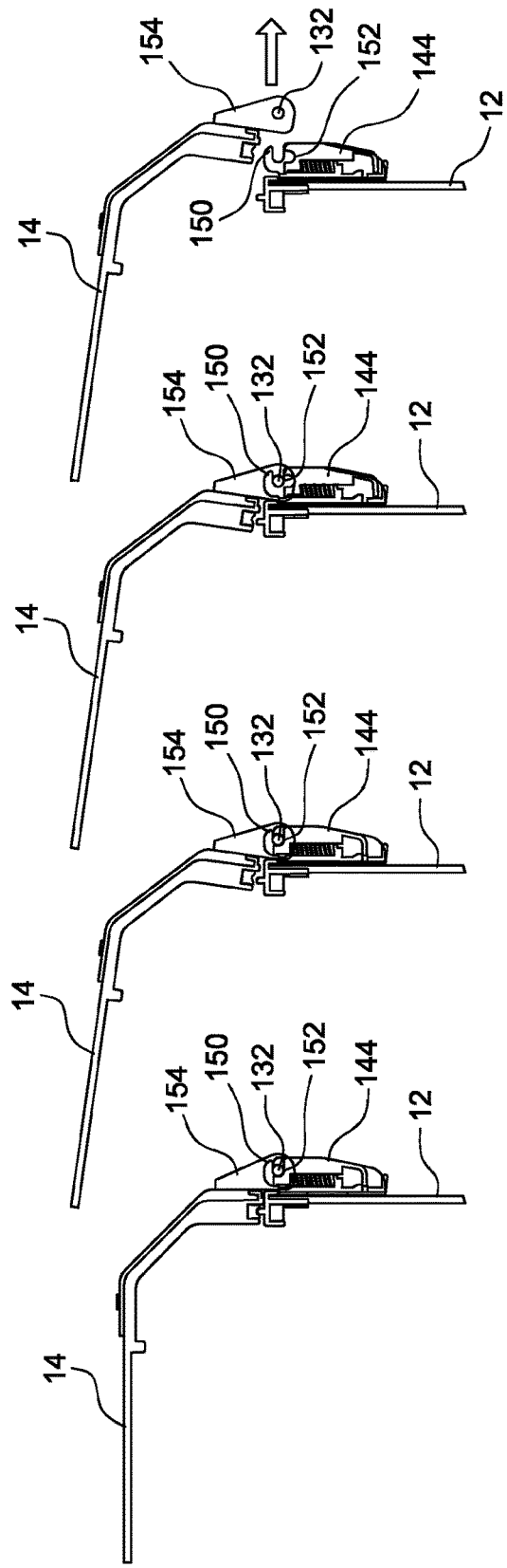

CASE FOR MOTORCYCLES

The present invention refers to a case for motorcycles, as well as to a system for opening/closing such a case and for engaging/disengaging it with respect to a fixed structure of the motorcycle.

BACKGROUND OF THE INVENTION

On motorcycles in general it is well known to use top boxes, bags or cases that are suitable for housing luggage, helmets or other accessories. Such cases are usually applied to the rear part of the motorcycle and normally comprise a special frame, which is stably fixed to the motorcycle itself, and systems for engaging such a frame. Usually, the engagement systems are of the removable type and are provided in the bottom portion of the case.

Among cases which can be applied to motorcycles, so called lateral cases are known, which are generally positioned at the sides of the rear wheel of the motorcycle. Such lateral cases are normally manufactured from a plastic material and can be provided with special systems for engaging and disengaging to/from the frame of the motorcycle of the type described, for example, in document WO 2007/045371 A1 in the name of the same applicant.

In order to meet the needs of the market, lateral cases for motorcycles have been developed that are manufactured from metal material, more precisely from sheet aluminium. Due to intrinsic technological/constructive limitations, such lateral cases made from sheet aluminium must be completely smooth inside, without therefore having sliding housings for buttons and latches like, on the other hand, usually occurs in conventional cases, made from plastic with the injection moulding method.

Metal cases for motorcycles currently available on the market have two or three separate locks for separately managing the operations of opening and closing the case and operations of engaging and disengaging the case itself with respect to the frame of the motorcycle. Irrespective of the number of locks, the procedure of engaging the metal cases of the known type to the motorcycle is moreover quite complex and laborious.

In addition, it is commonly known that lateral cases can be assembled on a motorcycle in combination with a rear central top box, which is normally positioned above such lateral cases. The rear central top box can have a width such as to at least partially cover the lateral cases, as shown for example in FIG. 11. In such a case, if the lateral cases are provided with an upper cover that can be opened at the top, as shown for example in FIG. 12, the rear central top box could interfere with the opening of the cases. In other words, the cover of each lateral case could not completely open due to the presence of the top box, with consequent limitations relative to the accessibility of the cases.

BRIEF SUMMARY OF THE INVENTION

The purpose of the present invention is therefore that of making a case for motorcycles, as well as a system for opening/closing such a case and for engaging/disengaging it with respect to a fixed structure of the motorcycle, which is capable of solving the aforementioned drawbacks of the prior art in an extremely simple, cost-effective and particularly functional manner.

In detail, one purpose of the invention is that of making a case for motorcycles, in particular a lateral case manufactured from metal material, in which it is possible to carry out the operations of opening and closing the case and the operations of engaging and disengaging the case itself with respect to the frame of the motorcycle by using just one key.

Another purpose of the invention is that of making a case for motorcycles, in particular a lateral case that is manufactured from metal material, which makes it possible to carry out the engagement and disengagement operations of the case with respect to the frame of the motorcycle in a simple and fast manner.

Another purpose of the invention is that of making a case for motorcycles that can be fully accessed, also if there is a rear central top box, or any other object arranged in the proximity of the cover of the case and such as to make it difficult to open.

A further purpose of the invention is that of making a case for motorcycles in which it is possible to avoid the accidental and undesired opening of the relative cover, or at least reduce the probability of it occurring.

Yet another purpose of the invention is that of making a case for motorcycles and a relative system for opening/closing and engaging/disengaging it with respect to a fixed structure of the motorcycle that have a simple and sturdy structure.

These purposes according to the present invention are achieved by making a case for motorcycles and a relative system for opening/closing and engaging/disengaging it with respect to a fixed structure of the motorcycle as outlined in claim 1.

Further characteristics of the invention are highlighted from the dependent claims, which are an integrating part of the present description.

BRIEF DESCRIPTION OF THE SEVERAL VIEWS OF THE DRAWINGS(S)

The characteristics and the advantages of a case for motorcycles and a relative system for opening/closing and engaging/disengaging it with respect to a fixed structure of the motorcycle according to the present invention shall become clearer from the following description, given as an example and not for limiting purposes, with reference to the attached schematic drawings, in which:

FIGS. 6A and 6B are two exploded views of the mechanism for engaging and disengaging the case of FIGS. 1A and 1B to the supporting structure of FIGS. 4A and 4B or 4C, 4D and 4E;

Figure 11:
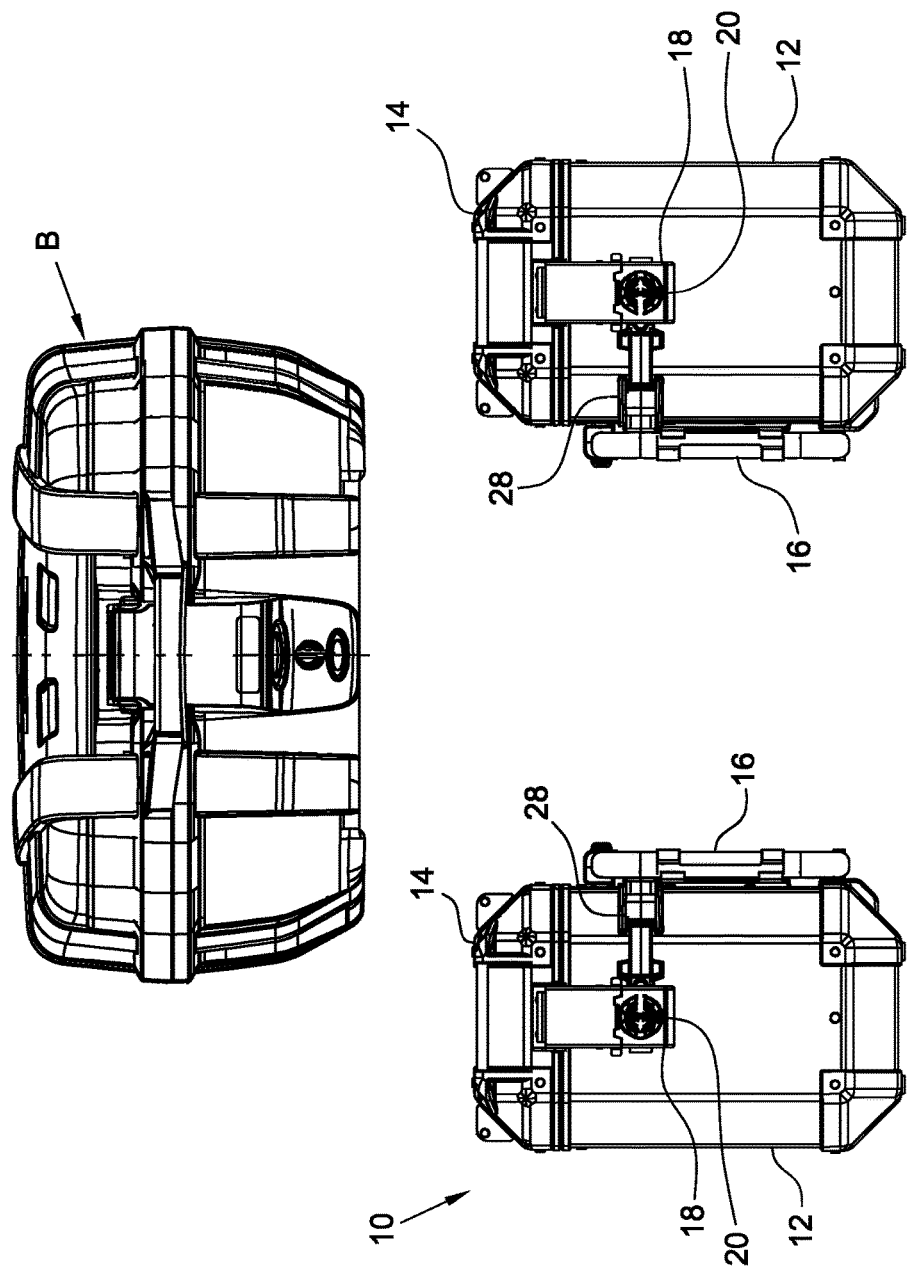
FIG. 11 is a front view that illustrates another embodiment of two separate cases for motorcycles according to the present invention, ideally arranged at the sides of a motorcycle with a generic top box above them.
Figure 15:
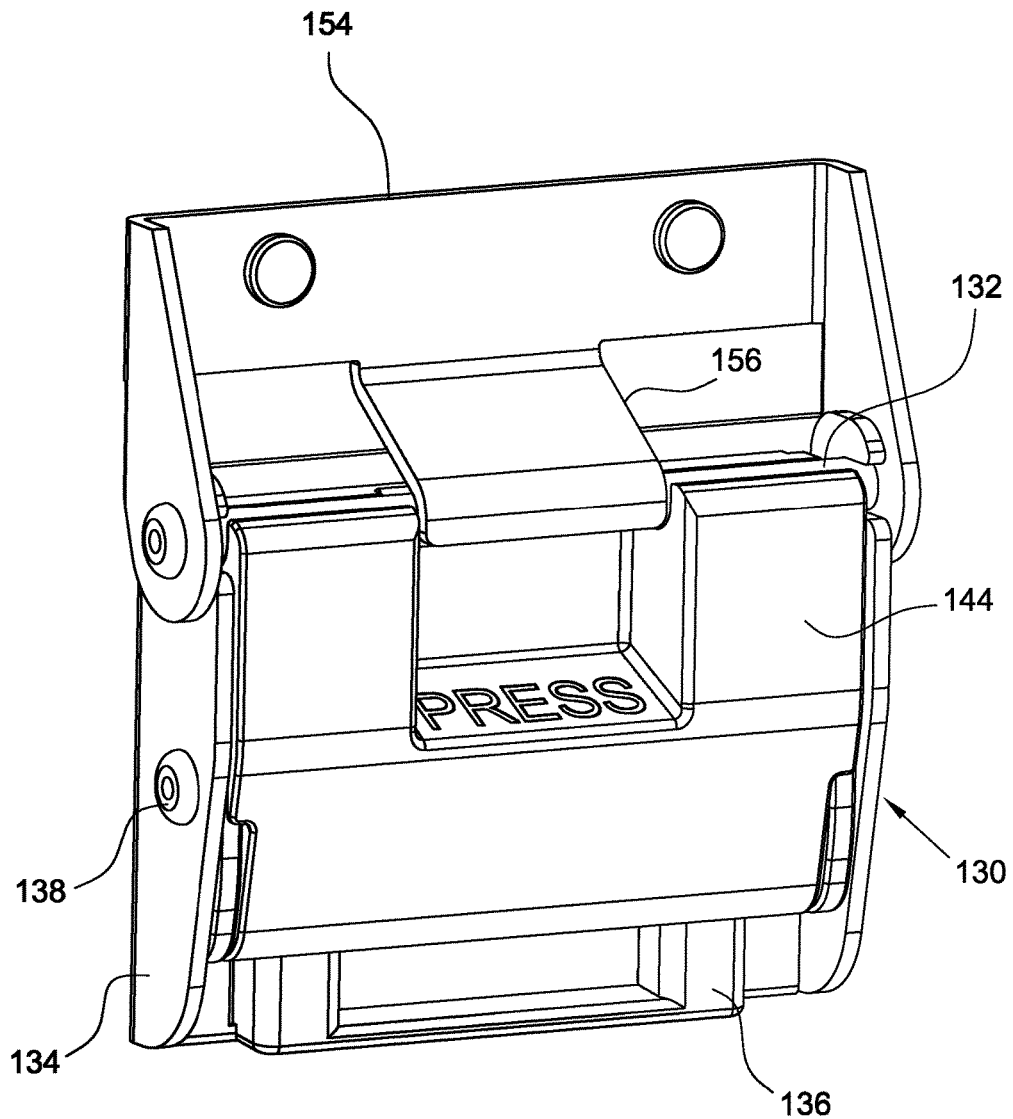
Figure 16:
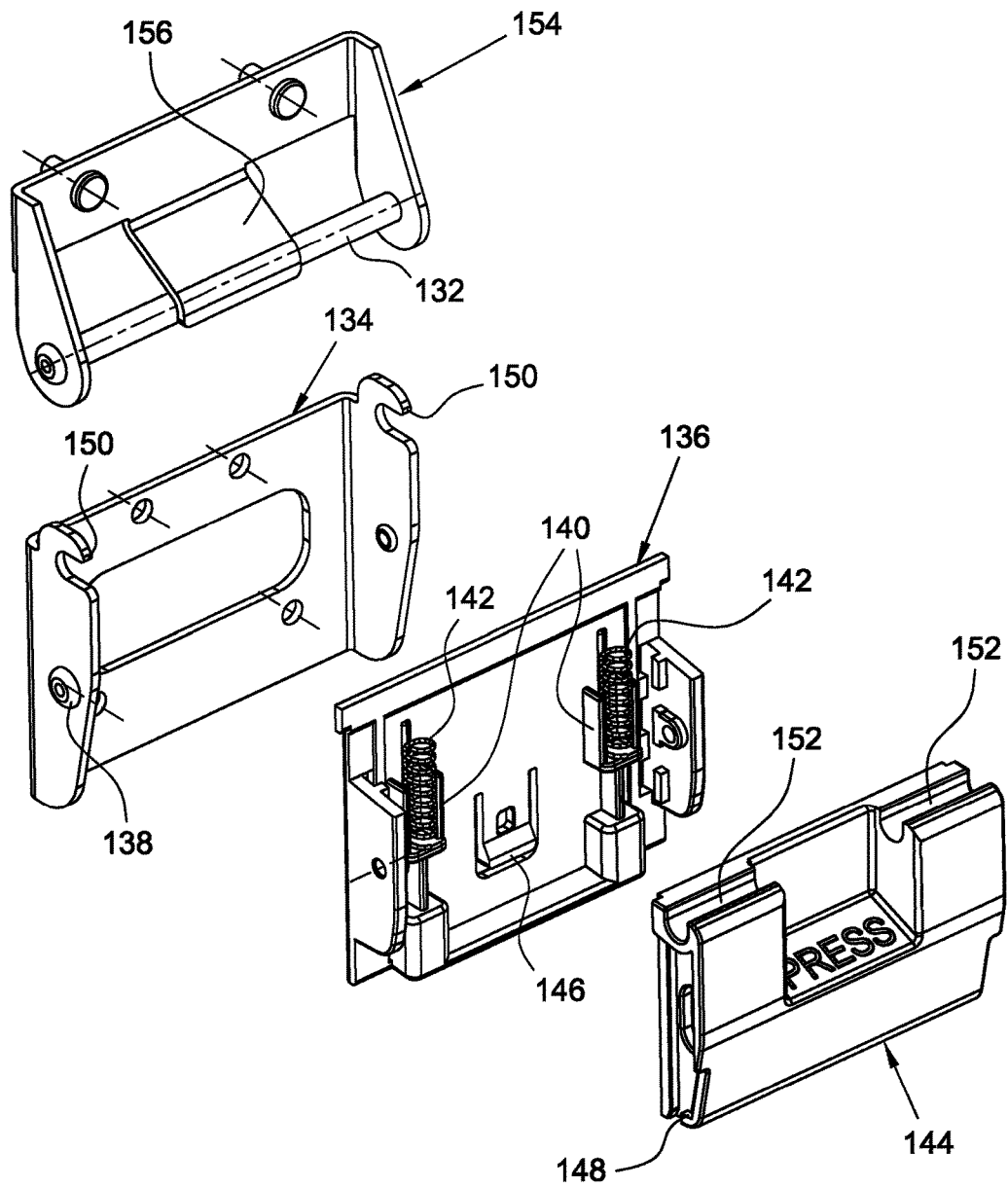

FIGS. 15 and 16 respectively show, in a front and exploded view, the engagement/disengagement mechanism of the cover with respect to the base portion of one of the cases of FIG. 11;

FIGS. 17A, 17B and 17C show the engagement steps of the cover with respect to the base portion of one of the cases of FIG. 11; and FIGS. 18A, 18B, 18C and 18D show the steps of disengagement of the cover with respect to the base portion of one of the cases of FIG. 11.

DETAILED DESCRIPTION OF THE INVENTION

With reference in particular to FIGS. 1A-10C, two very similar embodiments of the case for motorcycles according to the present invention are shown, wholly indicated with reference numeral 10. The case 10, preferably parallelepiped-shaped, essentially comprises a base portion 12, a cover 14, hinged to such a base portion 12 in order to pass from an open configuration to a closed configuration of the case 10 and vice versa, and a supporting structure 16, which can be constrained on one side to the base portion 12.

Figure 12:
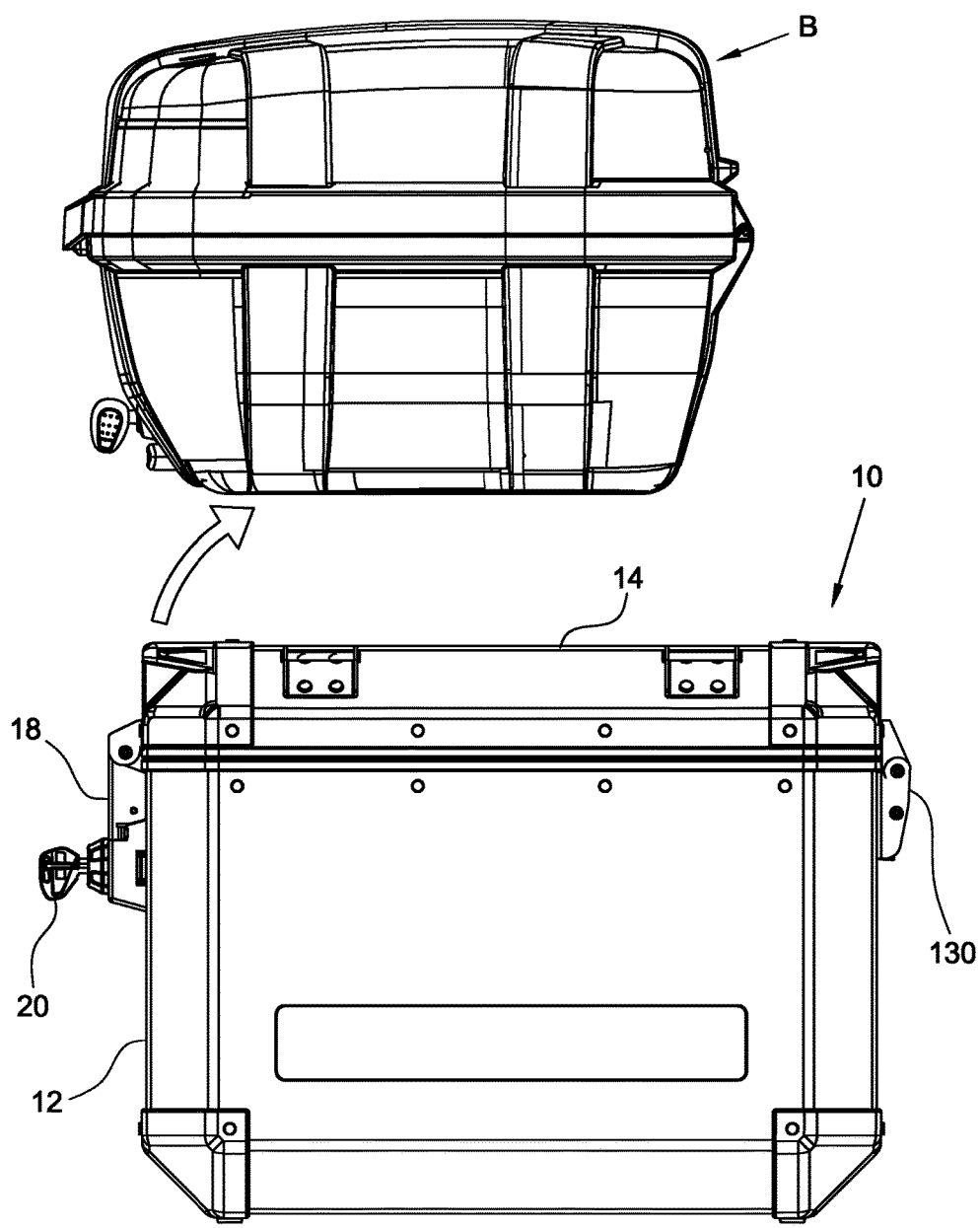
FIG. 12 is a side view that illustrates the arrangement of the cases of FIG. 11.
Figure 13:
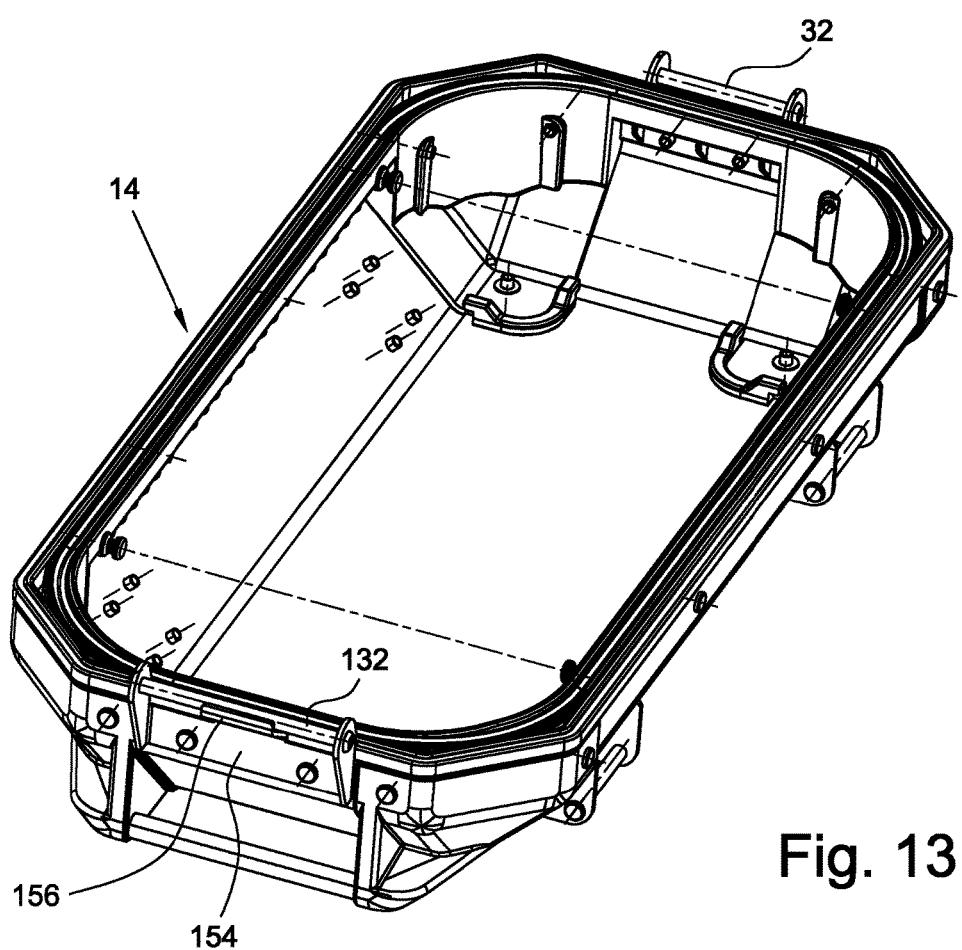
FIG. 13 is a perspective view, from the inside, of the cover of one of the cases of FIG. 11.
Figure 14:
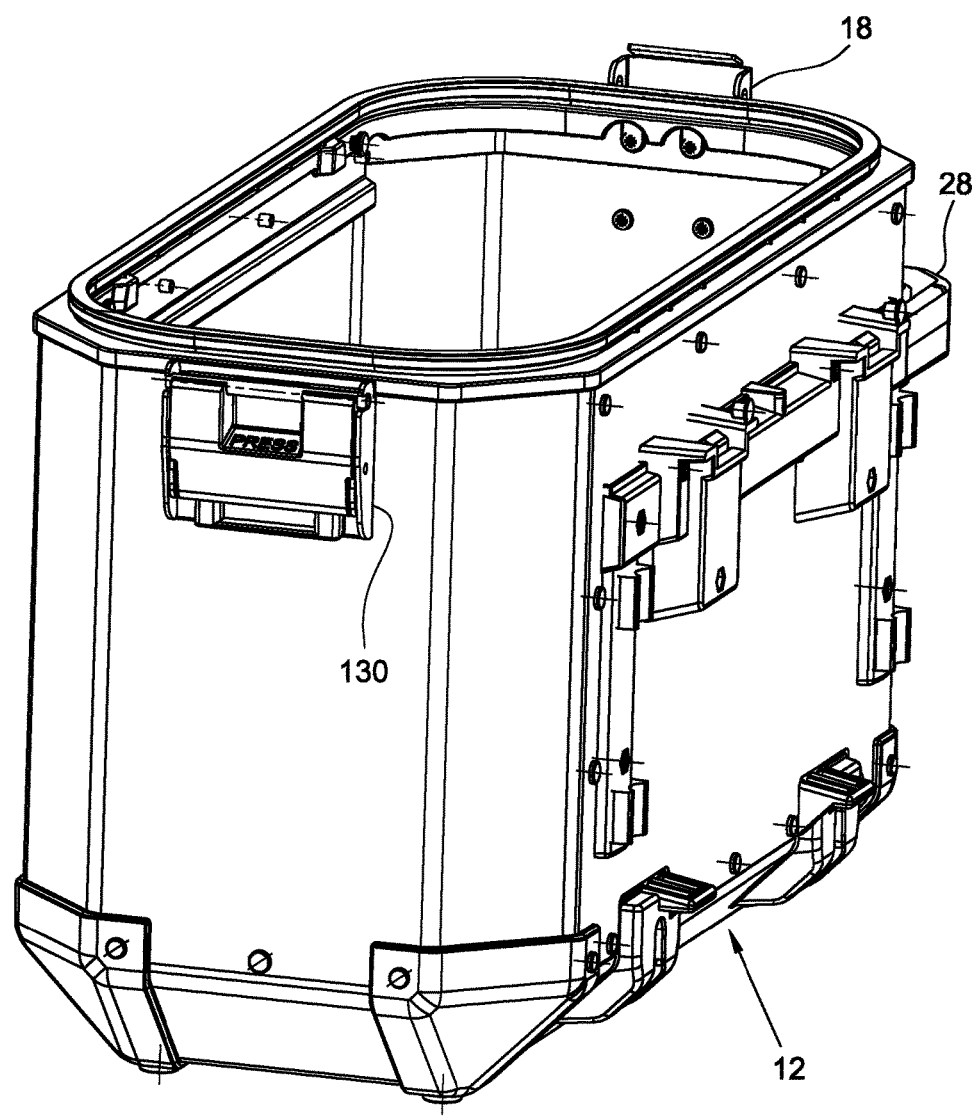
FIG. 14 is a perspective view of the base portion of one of the cases of FIG. 11.

The supporting structure 16, of the tubular type, is thus intended to be constrained, on the opposite side, to a fixed structure of the motorcycle, like for example the rear mudguard or the load-bearing frame of the motorcycle itself, by means of fixing means of the known type. The case 10 can thus be applied to the motorcycle both in the lateral position ("side bag"), and above the rear mudguard of the motorcycle itself ("rear top box"), although other applications in different positions on the motorcycle should not be excluded, without for this reason departing from the scope of protection of the present invention. For example, as shown in FIGS. 11 and 12, the case 10 can be configured so as to be applied to the motorcycle in a lateral position and to have a generic top box B above it.

On one side of the base portion 12 a lock mechanism 18 with a key 20, operatively connected to the cover 14, is permanently constrained. According to the invention, the case 10 is provided with first releasable engaging means between the base portion 12 and the cover 14 and second releasable engaging means 28 between such a base portion 12 and the supporting structure 16. Both the first engaging means, and the second engaging means 28 are simultaneously released by the key 20 of the lock mechanism 18 in order to selectively obtain the opening of the cover 14 with respect to the base portion 12 and/or the disengagement of such a base portion 12 with respect to the supporting structure 16, as shall be described in greater detail in the rest of the description.

In detail, the base portion 12 of the case is provided, on one side, with the lock mechanism 18 and, on the opposite side, with a pin 22 which acts as a rotation fulcrum of the cover 14 with respect to the base portion 12. As shown in FIGS. 2A-2D, on the base portion 12 all the elements that allow the reversible fixing of the case 10 to the supporting structure 16 are moreover made integral. Such elements for reversible fixing comprise at least one shaped recess 24 that is suitable for inserting into its inside at least one corresponding headed pin 26 obtained on the supporting structure 16 (in the embodiments shown in the figures, the shaped recesses 24 and the corresponding headed pins 26 are in a number of two). Such reversible fixing elements moreover comprise the second releasable engaging means 28 between the base portion 12 and the supporting structure 16.

On the upper edge of the base portion 12 a perimetrical profile 30 is moreover applied, acting as an aesthetic finish and as a coupling edge with the cover 14.

The cover 14 of the case 10 (FIGS. 3A and 3B) is in turn provided with a first pin 32 which can be engaged with the first releasable engaging means between the base portion 12 and such a cover 14, as well as a rotation hinge 36 which can be engaged with the pin 22 of the base portion 12. The shape of such a rotation hinge 36 makes it possible, once a certain rotation angle has been obtained, to pull the cover 14 out of the base portion 12 so as to allow the case 10 to be loaded more easily.

A perimetrical profile 38, which couples with the respective profile 30 of the base portion 12, is moreover applied onto the lower edge of the cover 14. On the perimetrical profile 38 of the cover 14 a seat is formed for the positioning of a sealing gasket 40. On the cover 14 angular plates 42 are moreover applied that allow a pair of tubular bars 44 to be fixed that act as handles for moving the case 10 and for possibly removing the cover 14 from the base portion 12. The cover is finally completed by a series of pins 46, preferably four pins, which allow the user to fix objects above the case 10 thanks to commonly used elastic straps.

Figure 4A:
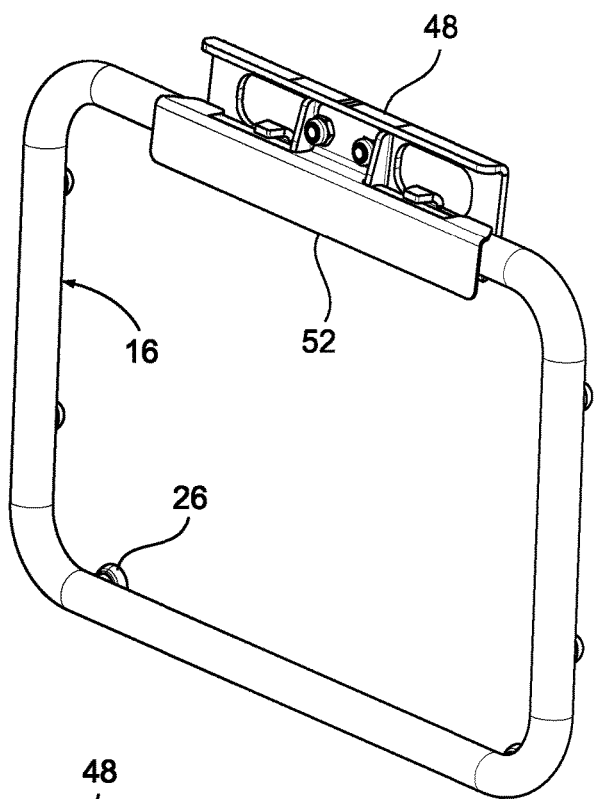
FIGS. 4A and 4B are two perspective views showing the structure for supporting and fixing to the motorcycle of the case of FIG. 1A.
Figure 4B:
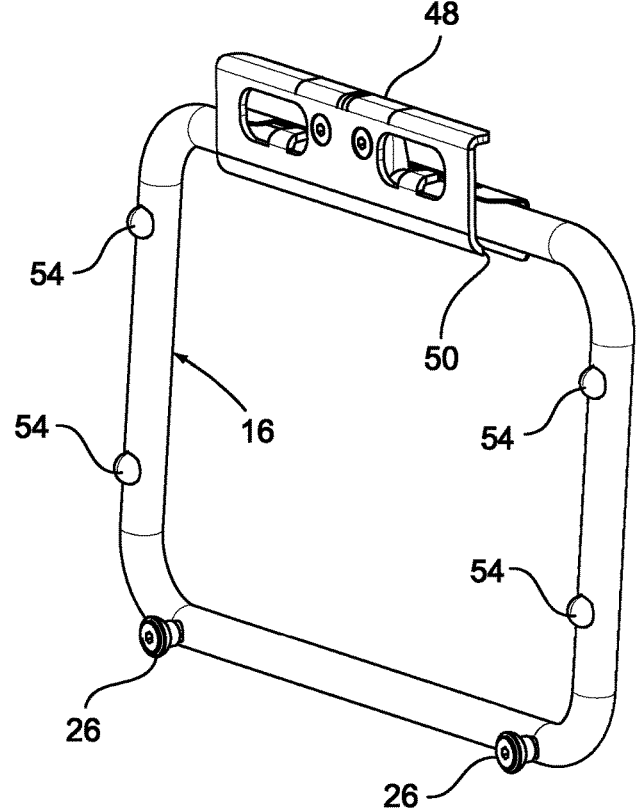

With reference to FIGS. 4A and 4B, these illustrate, in detail, a first embodiment of the supporting structure 16, which can be constrained, through means of the known type, to a fixed portion of the motorcycle and which is essentially made up of a metal tube that is curved so as to form a rectangular frame, joined at its four corners. On the lower portion of the rectangular frame 16 the aforementioned headed pins 26 are fixed. Such headed pins 26 have a shape such as to be inserted and coupled with recesses 24 that are present on the base portion 12.

On the upper portion of the rectangular frame 16 a first metal plate 48 is made integral on which, through suitable folding operations, a flanging 50 is formed which, as described more in detail in the rest of the description, allows the engagement of the case 10 to the rectangular frame 16 and therefore to the motorcycle. On the upper portion of the rectangular frame 16 a second metal plate 52 is made integral, which acts as an anti-intrusion barrier in order to protect the second engaging means 28 from possible theft attempts of the case 10. The rectangular frame 16 is completed by a plurality of rubber buffers 54 which, going into contrast and deforming against the base portion 12 in the engaged configuration of the case 10, have the function of zeroing the assembly clearances and therefore of avoiding annoying vibrations and noise for the user.

Figure 4C:
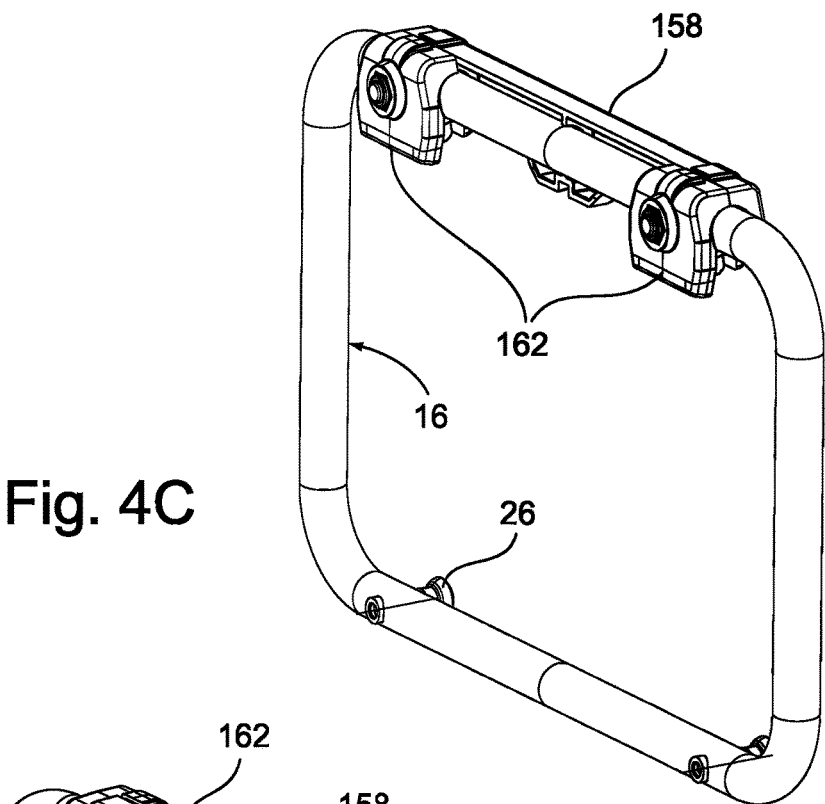
FIGS. 4C, 4D and 4E are three perspective views showing the structure for supporting and fixing to the motorcycle of the case of FIG. 1B.
Figure 4D:
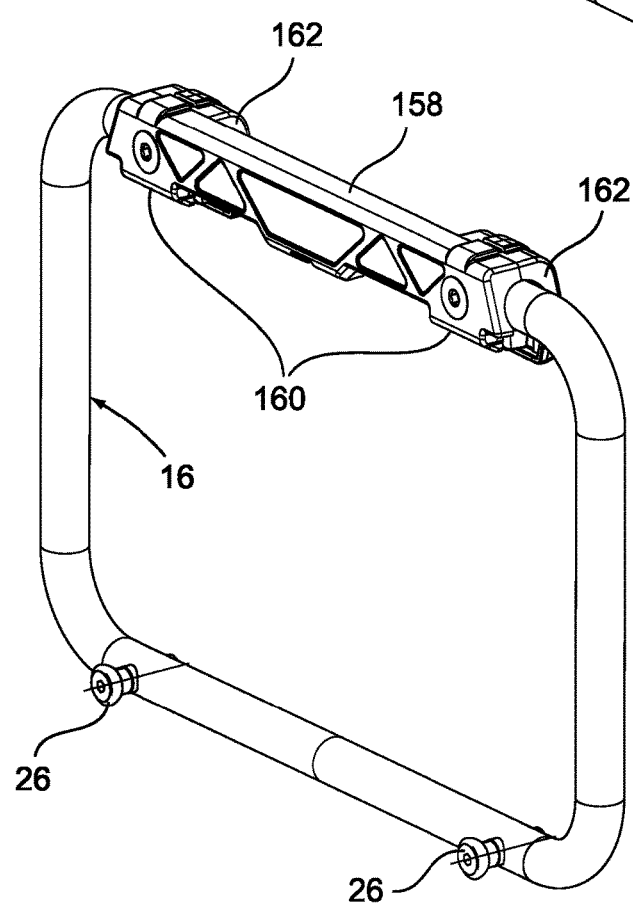
Figure 4E:
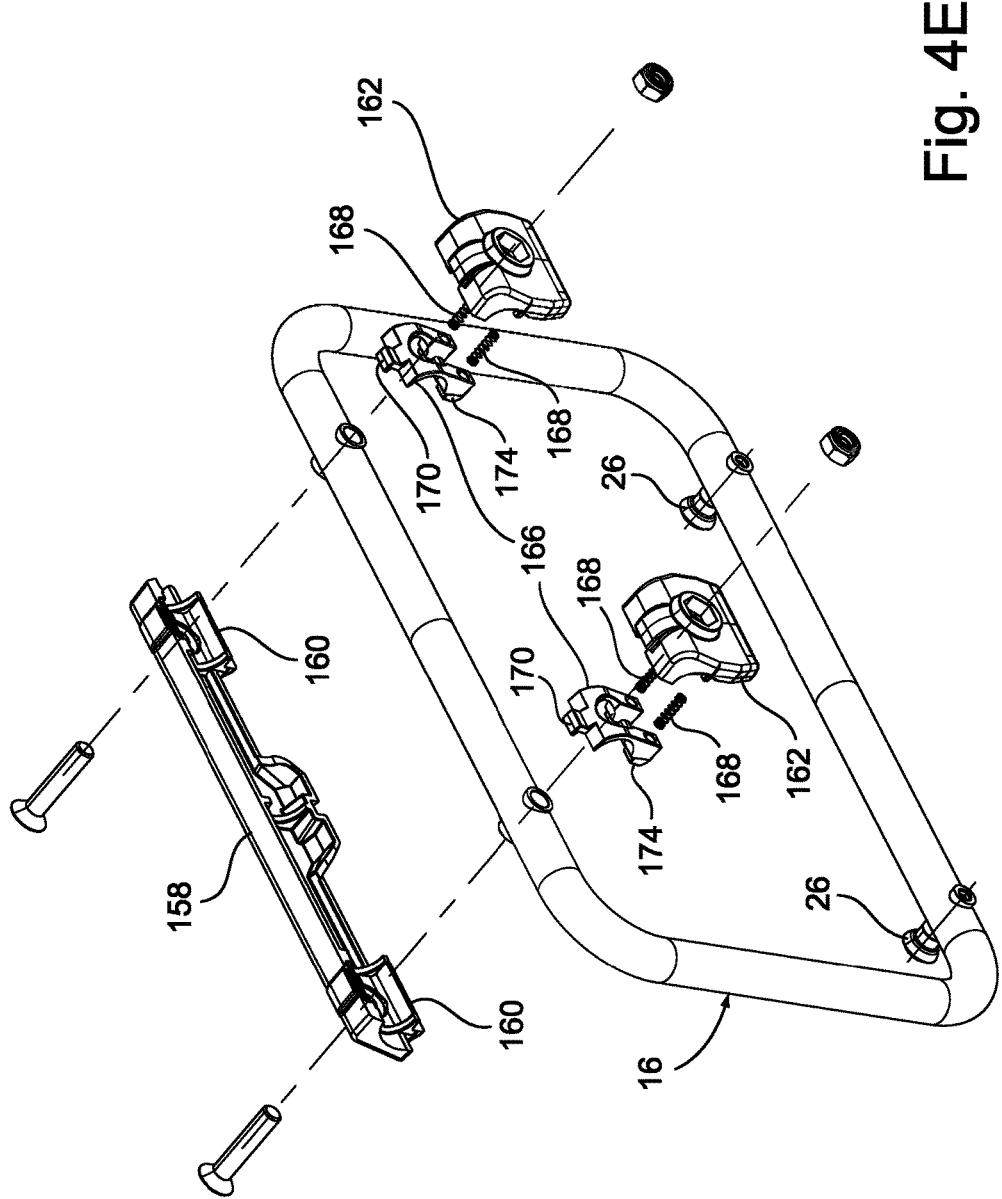

With reference to FIGS. 4C, 4D and 4E, a second embodiment of the supporting structure 16 is illustrated in detail. In this second embodiment of the supporting structure 16 the first metal plate 48 has been replaced by an equivalent bar 158 made from die-cast metal, on which one or more teeth 160 for engaging to such a supporting structure 16 are integrally obtained. One or more caps 162, made from die-cast metal and acting as an anti-intrusion barrier against theft, are thus fixed, at each tooth 160, to the die-cast metal bar 158.

Figure 1A:
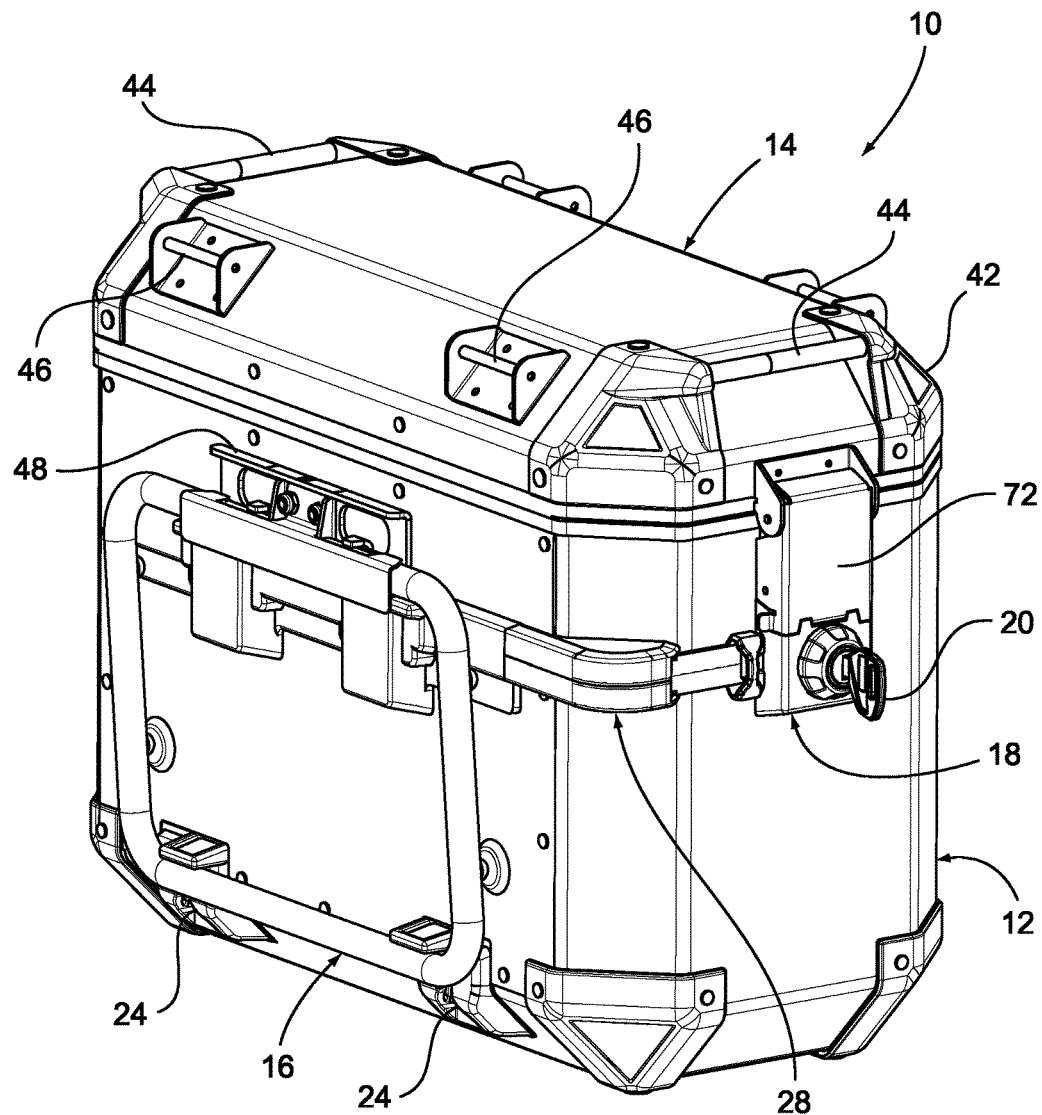
FIG. 1A is a perspective view of a first embodiment of the case for motorcycles and of the relative system for opening/closing and engaging/disengaging it with respect to a fixed structure of the motorcycle, according to the present invention.
Figure 1B:
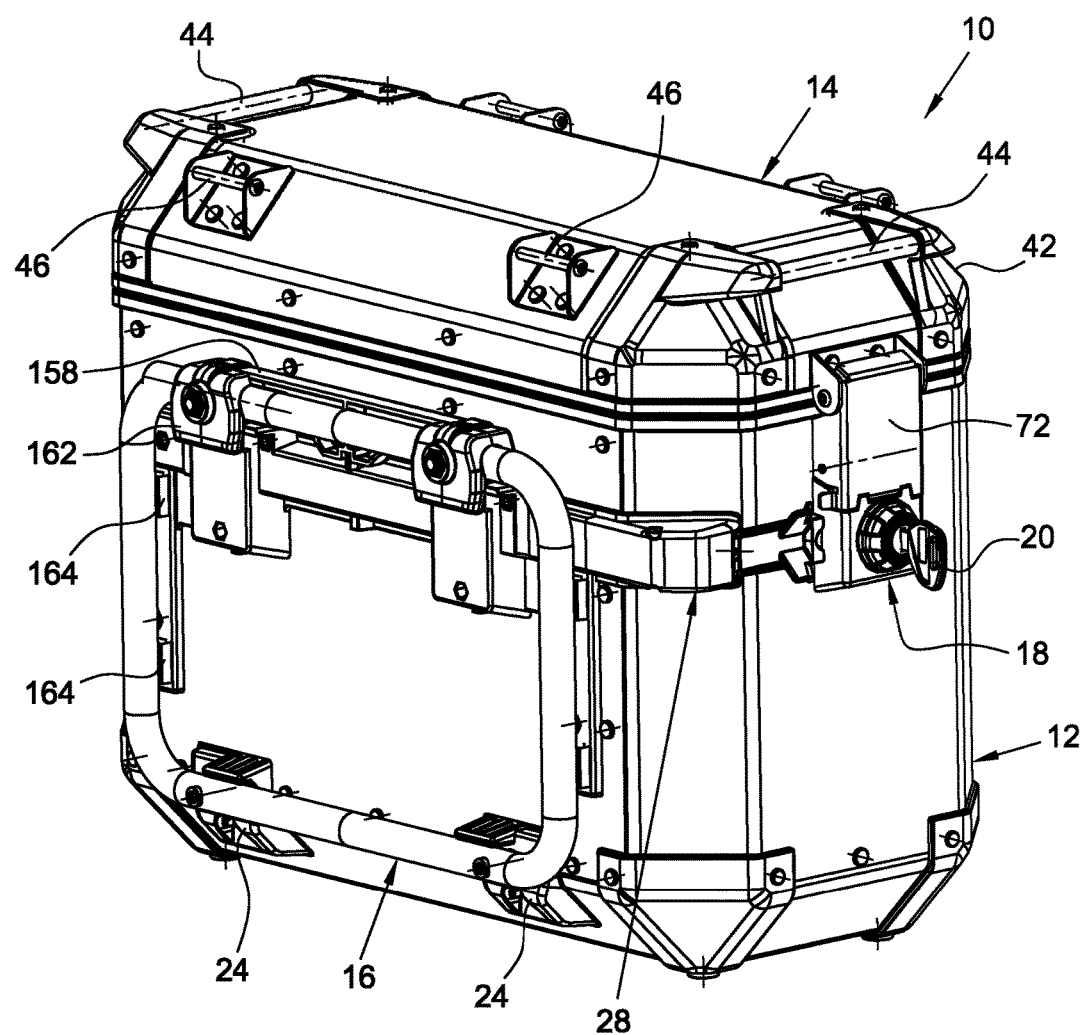
FIG. 1B is a perspective view of a second embodiment of the case for motorcycles and of the relative system for opening/closing and engaging/disengaging it with respect to a fixed structure of the motorcycle according to the present invention.
Figure 2A:
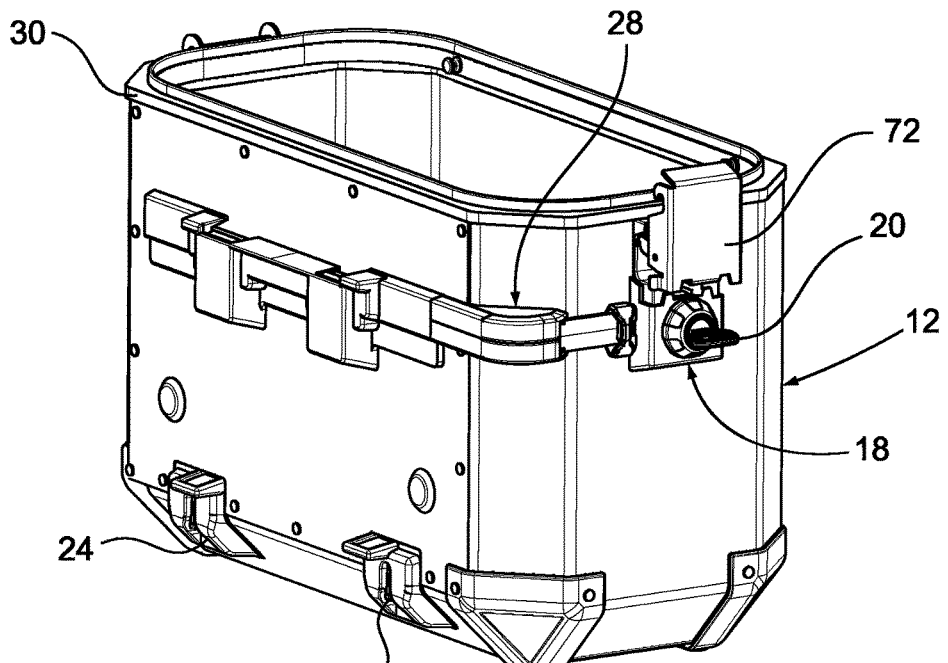
FIGS. 2A and 2B are two further perspective views of the case for motorcycles of FIG. 1A, shown without its cover.
Figure 2B:
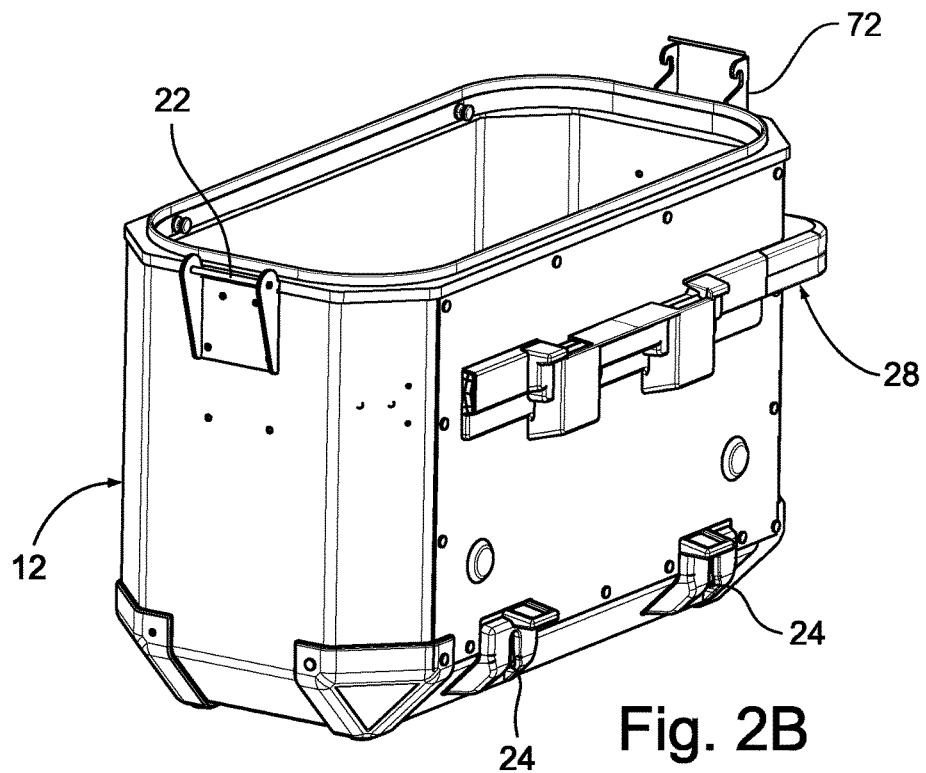
Figure 2C:
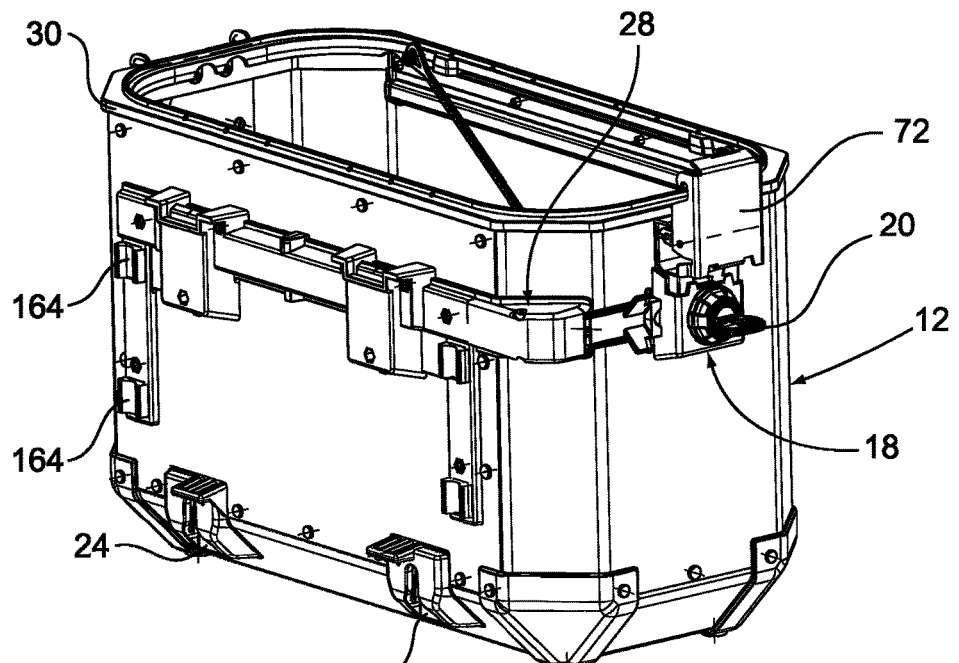
FIGS. 2C and 2D are two further perspective views of the case for motorcycles of FIG. 1B, shown without its cover.
Figure 2D:
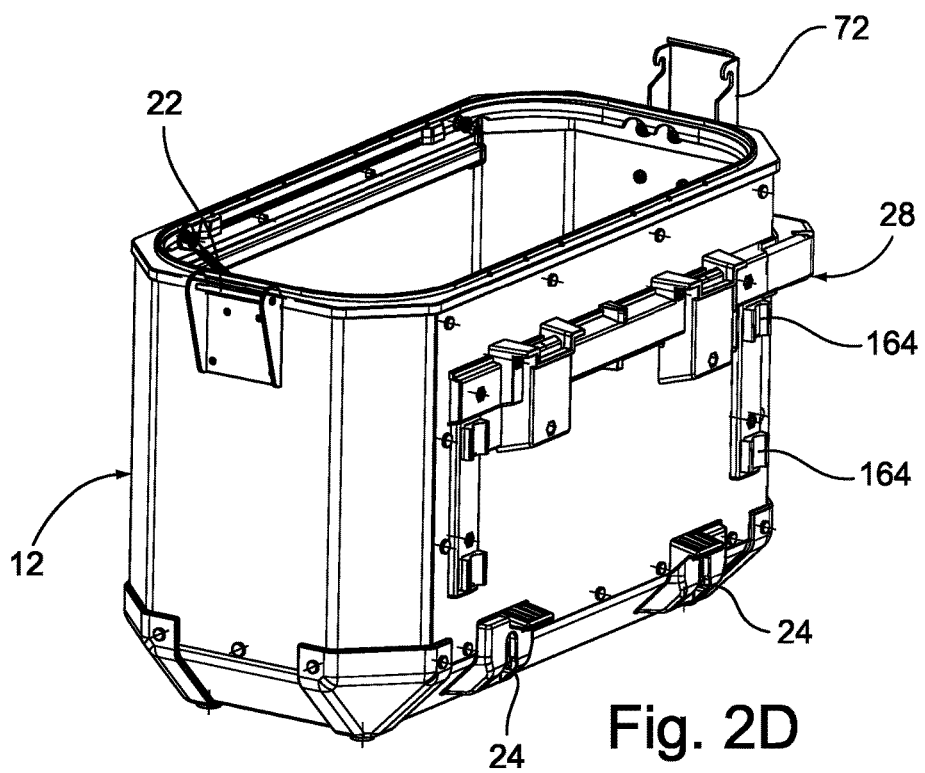
Figure 3A:
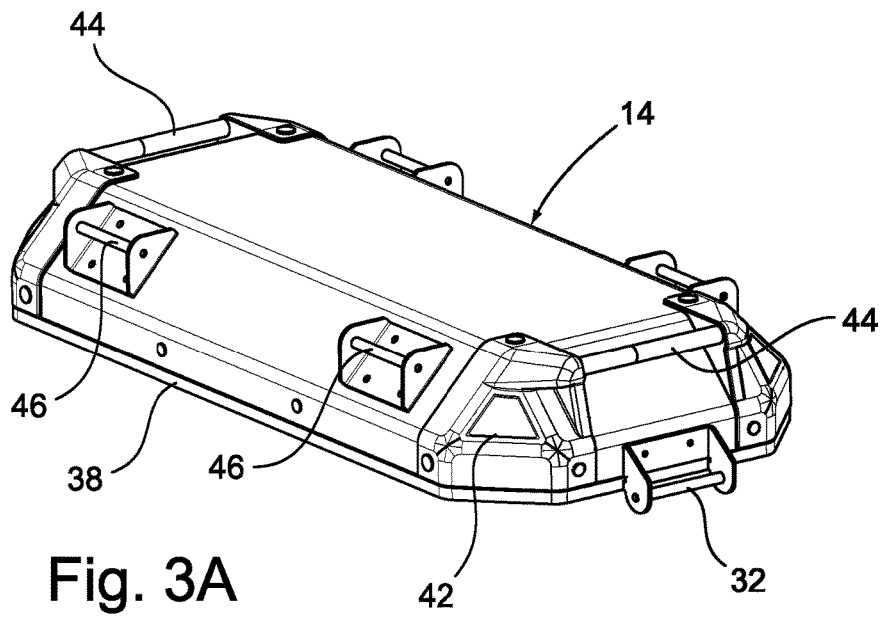
FIGS. 3A and 3B are two perspective views of the cover of the case for motorcycles of FIGS. 1A and 1B.
Figure 3B:
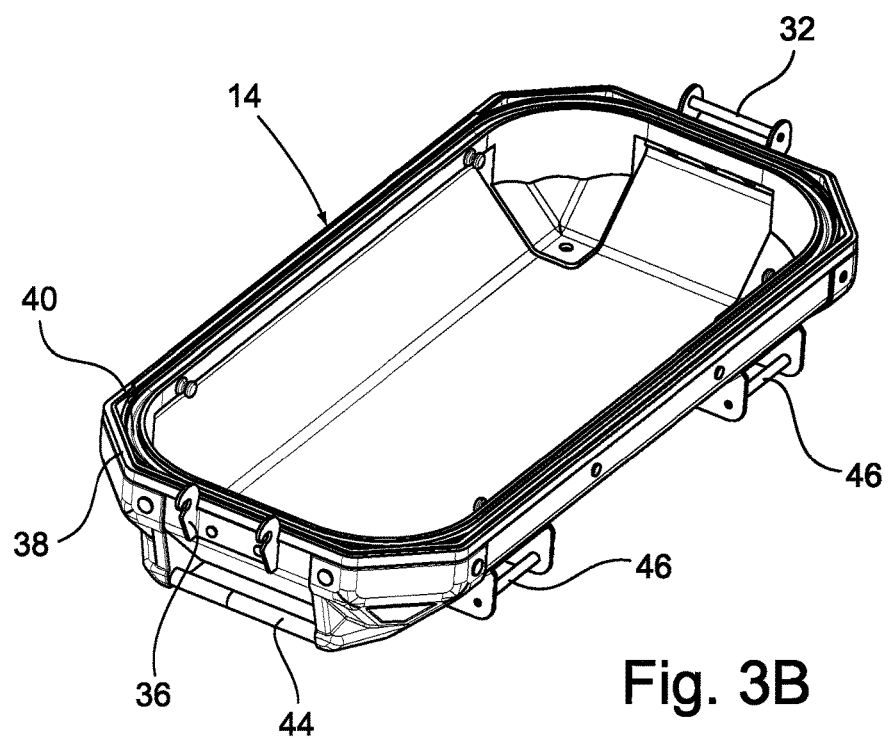

In this second embodiment the rubber buffers 164 are not assembled on the supporting structure 16, but rather directly on the case 10, as shown for example in FIGS. 2C and 2D. The function of these rubber buffers 164 in any case remains the same as the rubber buffers 54 of the first embodiment of the supporting structure 16.

The second embodiment of the supporting structure 16, in addition to simplifying the production and the functionality of the entire case 10, introduces an engagement indicator device which allows the user to understand whether the engagement of the case 10 to the relative supporting structure 16 has occurred correctly. The engagement indicator device is visible in the exploded view of FIG. 4E.

The engagement indicator device is made up of one or more indicating components 166 in plastic material, enclosed between the bar 158 and the respective one or more caps 162 and capable of rotating with respect to the supporting structure 16. The rotation of the indicating components 166 is contrasted by respective springs 168 that are interposed between the indicating components 166 themselves and the relative caps 162.

The upper portion 170 of each indicating component 166 is provided with two separate indicating signals, one of which is for example red, indicating the condition in which the case 10 is not engaged to the relative supporting structure 16, and the other of which is for example green, indicating the condition in which the case 10 is correctly engaged to the relative supporting structure 16. The upper portion 170 with the two coloured indicating signals is visible through a slit 172 (FIGS. 8G and 8H) obtained at the coupling point between the bar 158 and the respective caps 162.

Figure 8C:
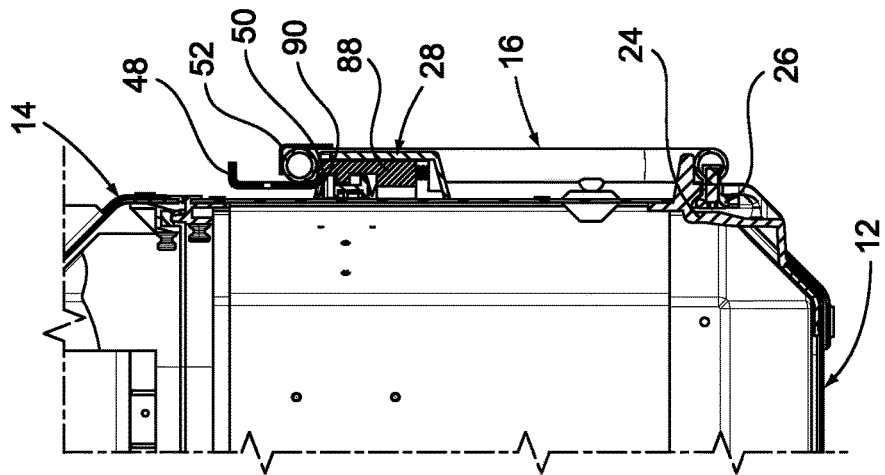
FIGS. 8A, 8B and 8C show the engagement steps of the case of FIG. 1A to the supporting structure of FIGS. 4A and 4B.
Figure 8B:
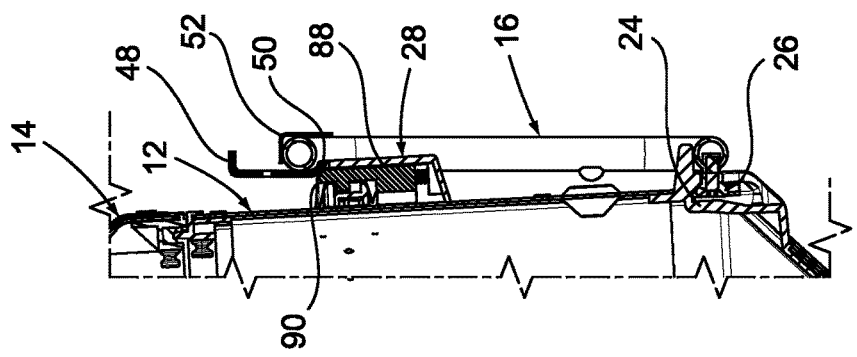
Figure 8A:
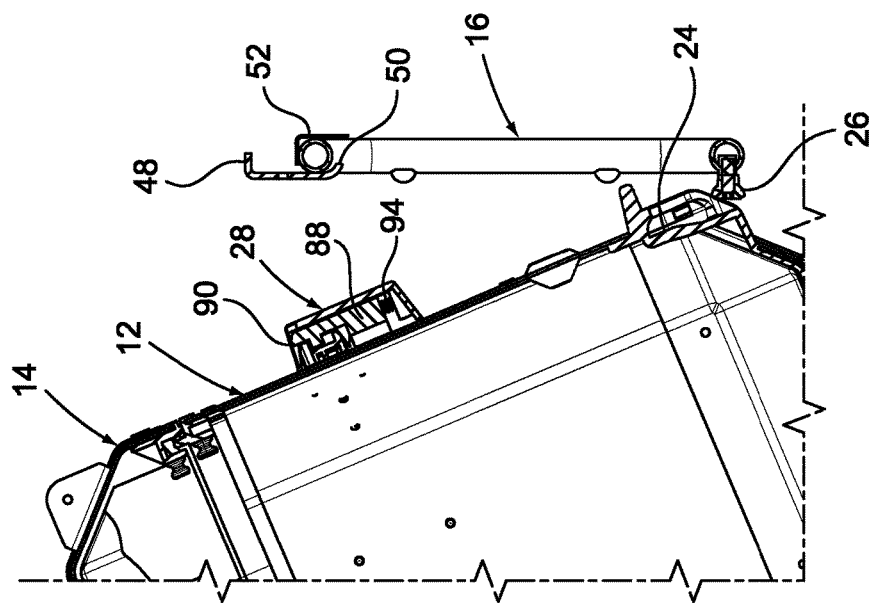
Figure 8F:
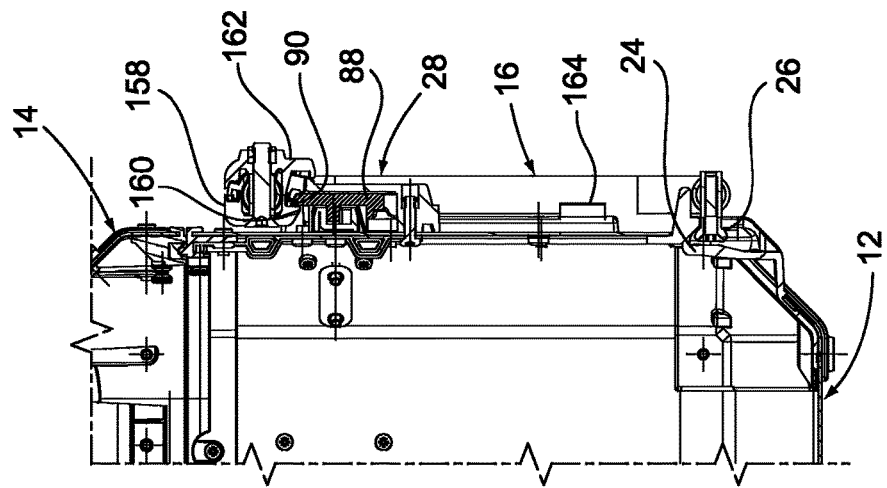
FIGS. 8D, 8E and 8F show the engagement steps of the case of FIG. 1B to the supporting structure of FIGS. 4C, 4D and 4E.
Figure 8E:
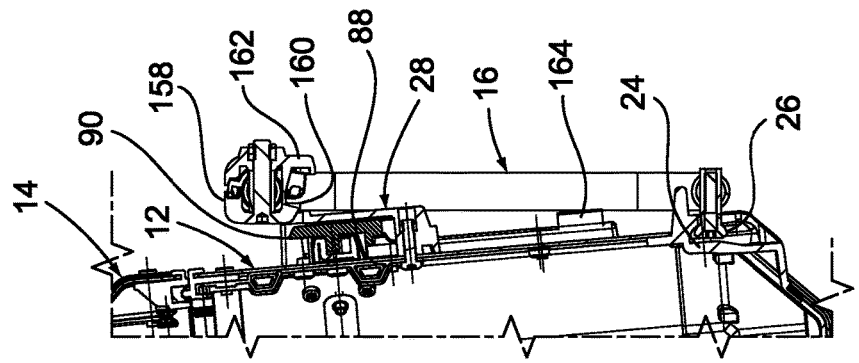
Figure 8D:
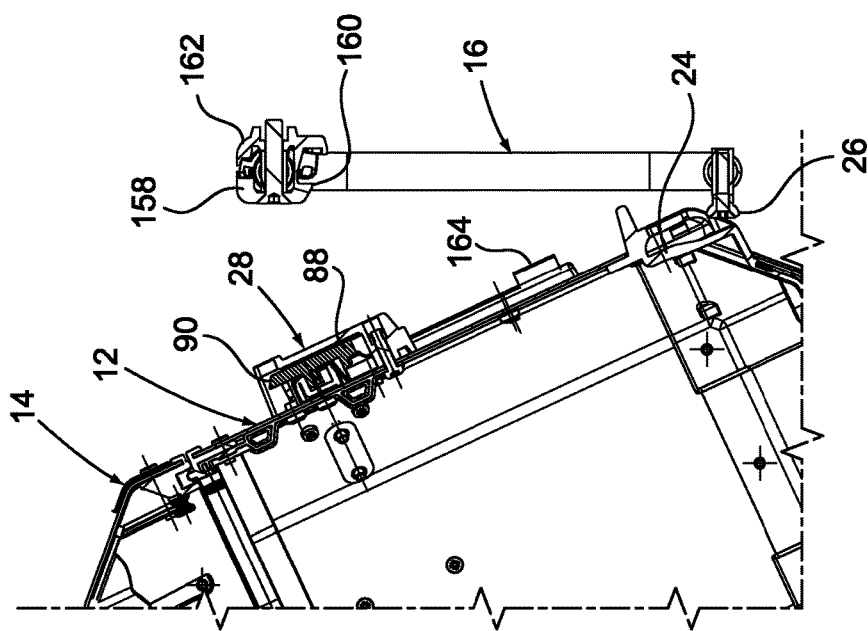
Figure 8H:
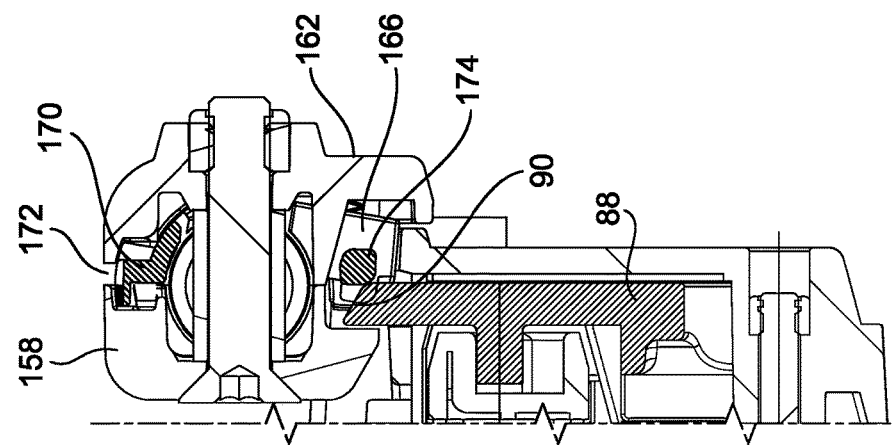
FIGS. 8G and 8H show an engagement indicator device of the case of FIG. 1B to the supporting structure of FIGS. 4C, 4D and 4E.
Figure 8G:
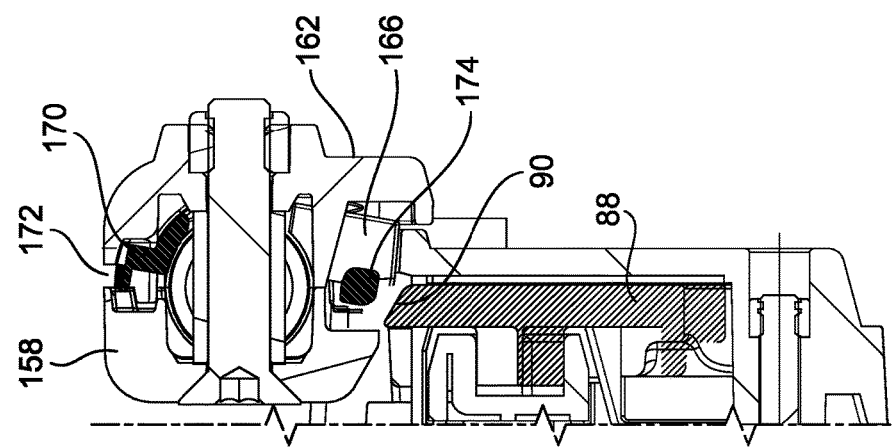

When the case 10 is disengaged from the relative supporting structure 16, the upper portion 170 of each indicating component 166 always shows the user the first colour (red), as indicated in FIG. 8G. When on the other hand the case 10 is engaged with the relative supporting structure 16 (FIG. 8H), the latch 88 acts on a lower portion 174 of each indicating component 166, making it rotate so that, through the slit 172, the second colour (green) can be seen.

Figure 5A:
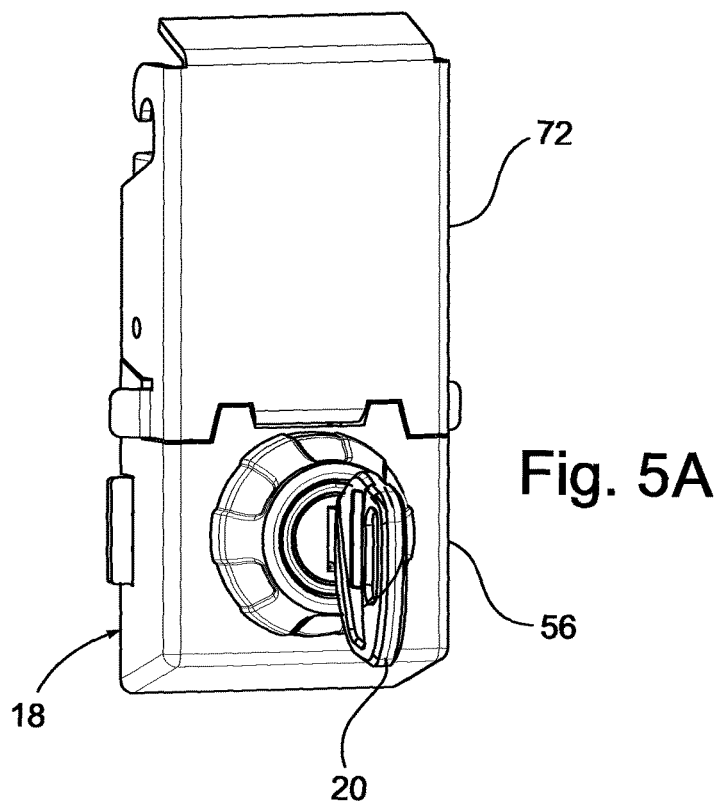
FIGS. 5A, 5B and 5C show, in a front view, rear view and exploded view, respectively, the lock group with a key of the case for motorcycles of FIGS. 1A and 1B.
Figure 5B:
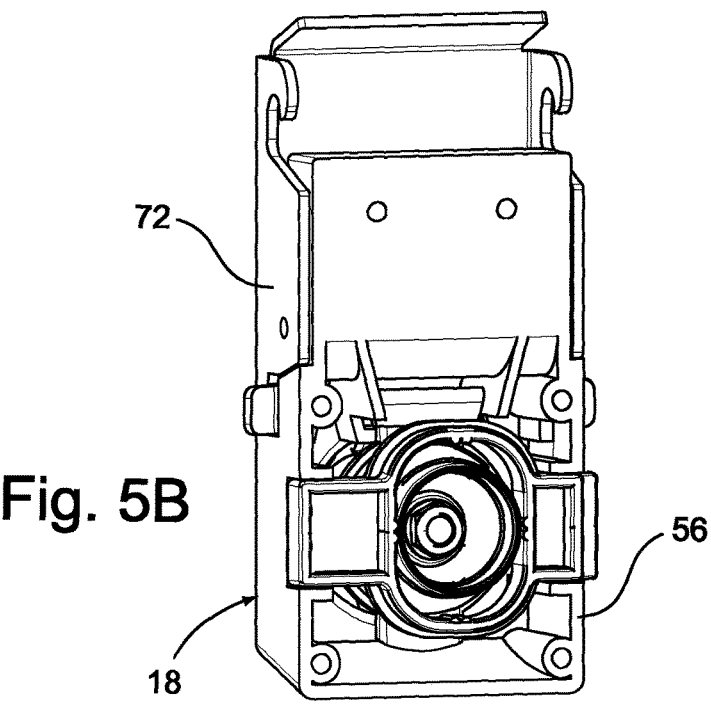
Figure 5C:
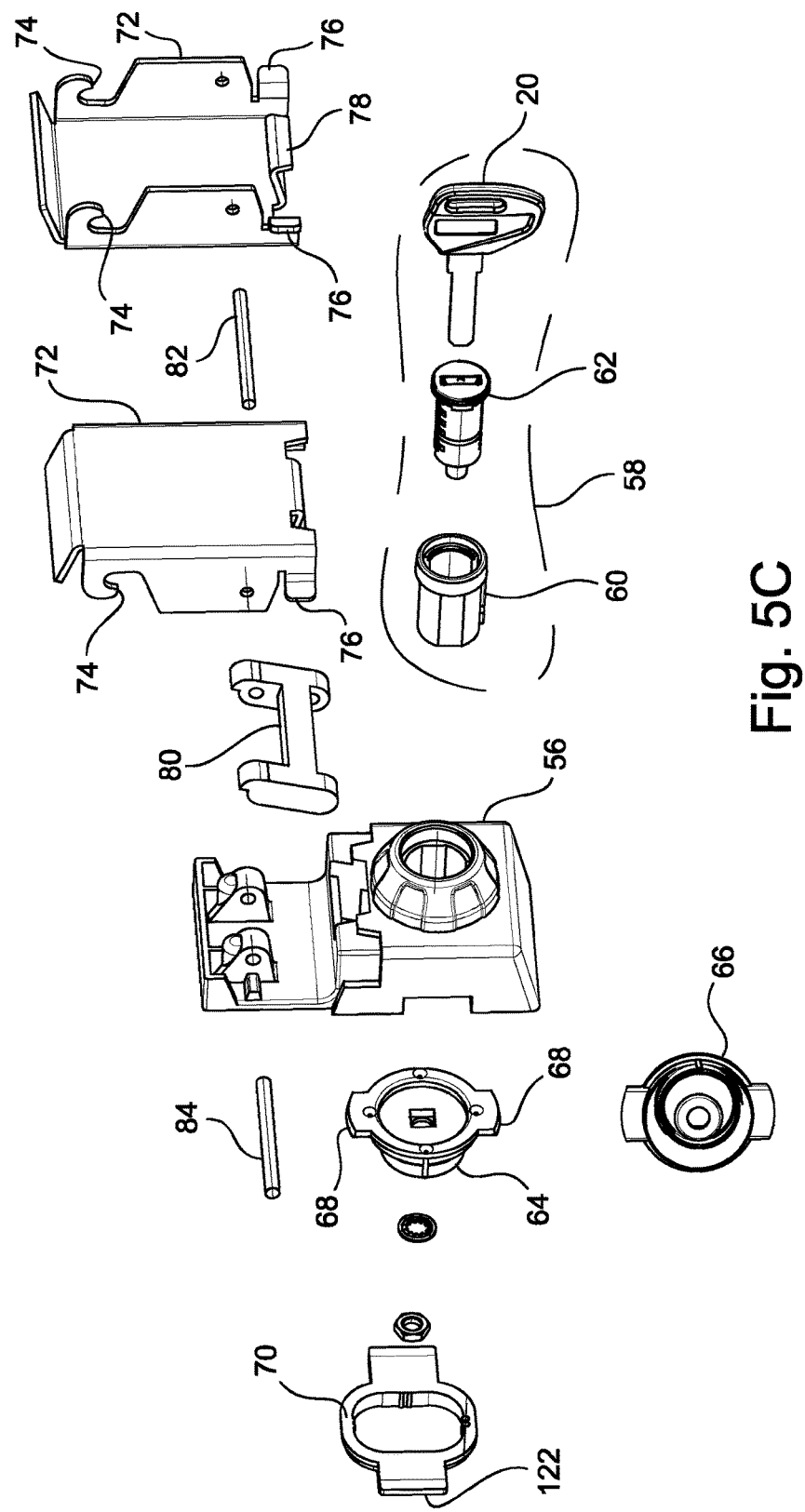

With reference to FIGS. 5A, 5B and 5C, these show the lock mechanism 18 illustrated in detail. It is made up of a main body 56 made from plastic material, in which a lock 58 is inserted consisting of a stator/bushing 60, a rotor 62 and the key 20. The rotor 62 is constrained to an under-lock plate 64. Therefore, by rotating the key 20 there is the same rotation on the under-lock plate 64. On the rotating under-lock plate 64 an eccentric disk 66 and two teeth 68 are integrally obtained.

The eccentric disk 66 of the under-lock plate 64 is coupled with a latch 70. The rotation of the key 20 and, consequently, the rotation of the assembly made up of the rotor 62 and of the under-lock plate 64 generate, by means of the action of the eccentric disk 66, the horizontal linear displacement of the latch 70. The need of having such a displacement shall become clearer in the rest of the description.

The lock mechanism 18 moreover comprises a hinge engaging tooth 72 on which two slots 74 are obtained which couple with the first pin 32 that is fixed to the cover 14. On the hinge engaging tooth 72, which forms the first releasable engaging means between the base portion 12 and the cover 14, two protrusions 76 are further obtained, so as to allow the gripping by the user in the opening and/or closing step of the cover 12, and a tailpiece 78. The hinge engaging tooth 72 is rotatably connected to the main body 56 of the lock mechanism 18 by means of a connecting rod 80 that is provided with two parallel pins 82 and 84, one pin 82 being integral with the engaging tooth 72 and the other pin 84 being integral with the main body 56. Thanks to the connecting rod 80 the engaging tooth 72 can roto-translate from the closed position to the open position of the lock mechanism 18.

Figure 6B:
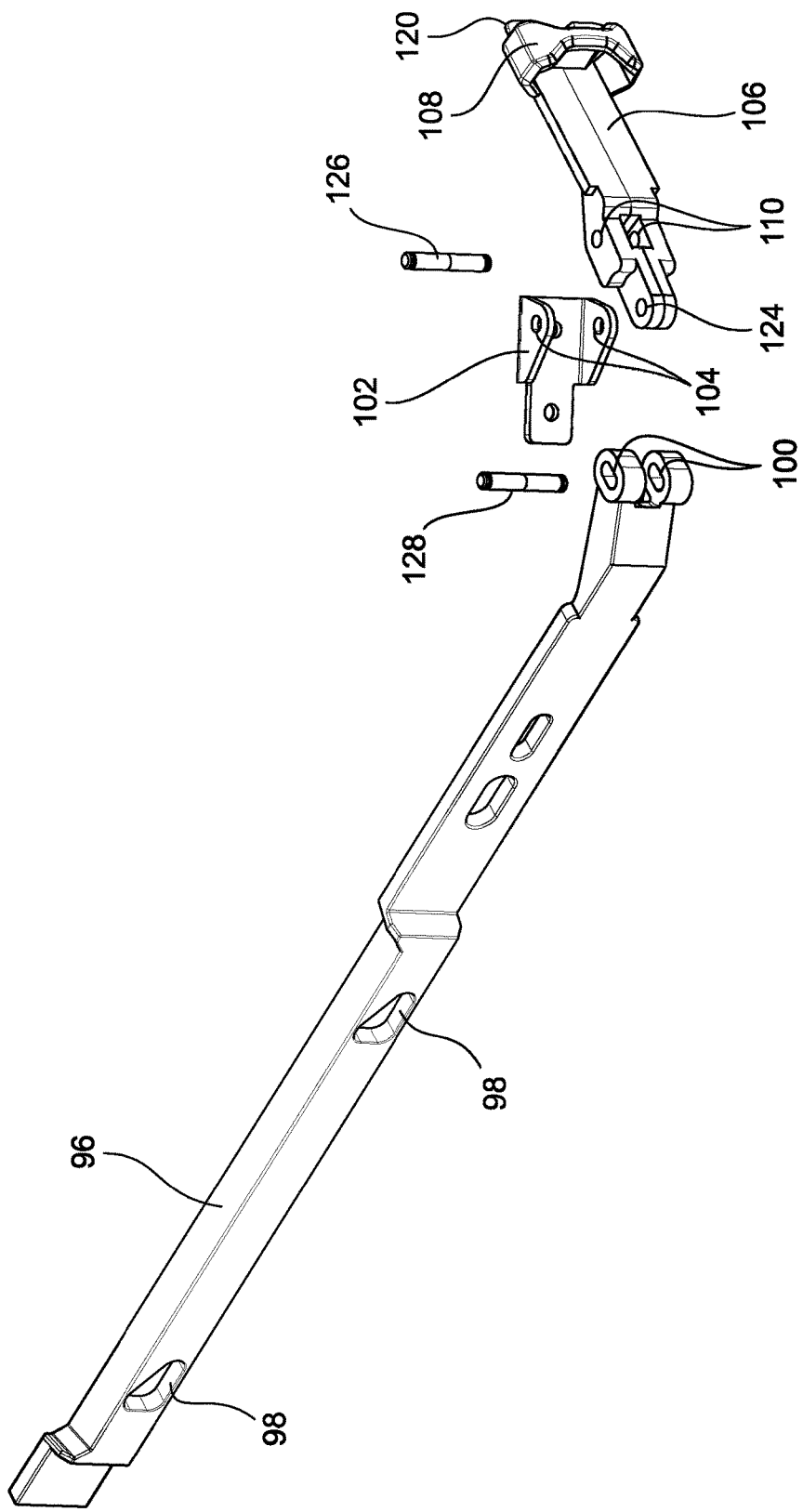

With reference to FIGS. 6A and 6B the second releasable engaging means 28 between the base portion 12 and the supporting structure 16 are finally illustrated in detail. Such second releasable engaging means 28 firstly comprise a main casing 86, that is made in plastic material and is fixed to the base portion 12. In the main casing 86 at least one latch 88 is slidably inserted (the latches 88 are preferably in a number of two) on which an inclined tooth 90 and a cylindrical pin 92 are integrally obtained. At least one cylindrical spring 94 is provided, acting by compression with respect to the main casing 86, which allows the movement in the vertical direction of each latch 88. In the main casing 86 a disengaging cursor 96 is moreover slidingly inserted, on which one or more shaped slots 98 and one or more eyes 100 are formed.

Figure 7:
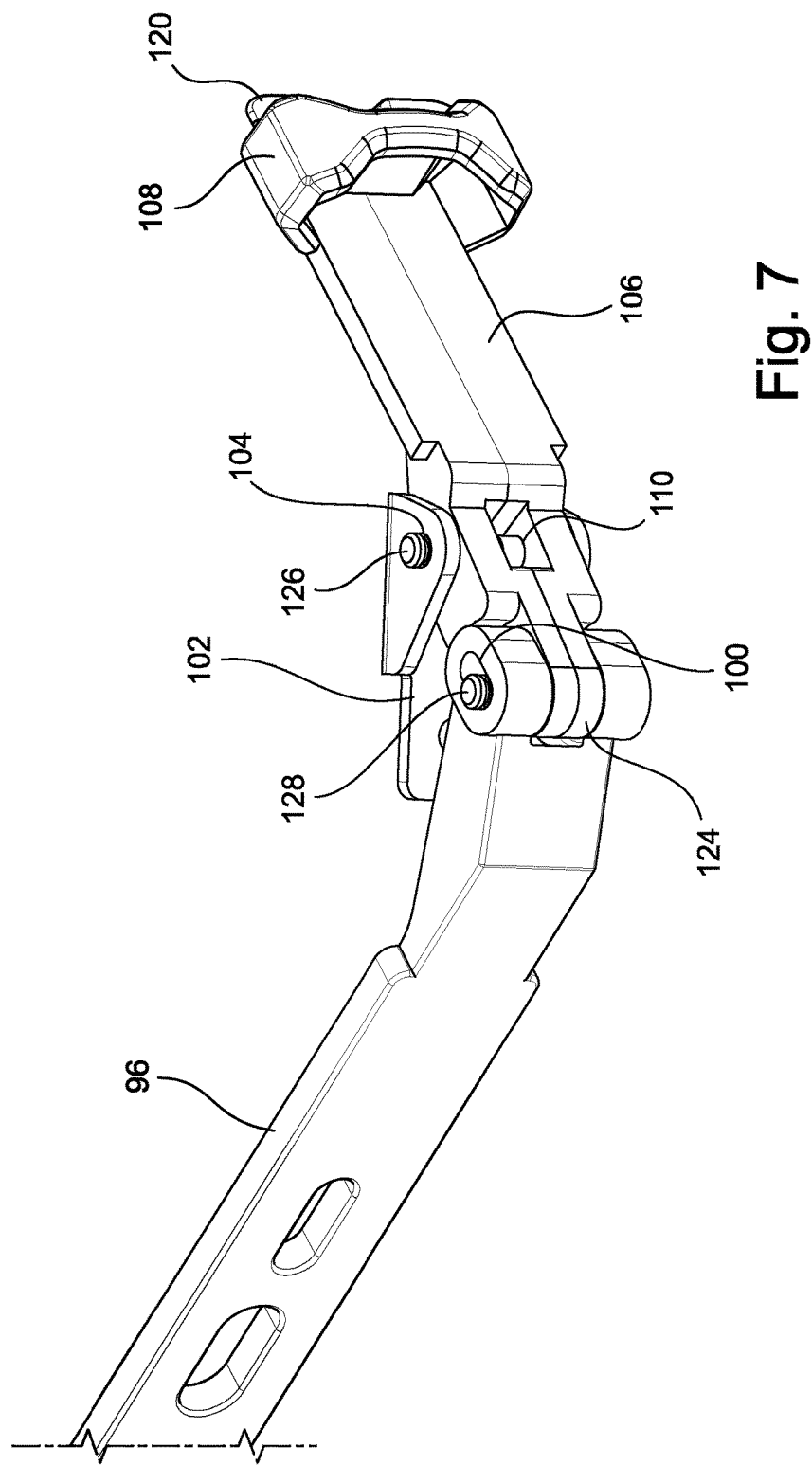
FIG. 7 is a partial view of the engagement and disengagement mechanism of the case of FIGS. 1A and 1B, shown in the assembled configuration.

The second releasable engaging means 28 between the base portion 12 and the supporting structure 16 thus comprise a fixing bracket 102, which is fixed to the base portion 12 and is provided with two through-holes 104. A disengaging lever 106 is provided, that is equipped with a gripping handle 108 on one side and with two further pairs of through-holes 110 and 124 on the opposite side (FIG. 6B). Such a disengaging lever 106 is fixed in an articulated manner to the fixing bracket 102 through a first shaft 126 that is inserted through the holes 104 and the first pair of holes 110 and is then connected to the disengaging cursor 96 with a second shaft 128 that is inserted through the eyes 100 and the second pair of holes 124 (FIG. 7). The second releasable engaging means 28 between the base portion 12 and the supporting structure 16 are finally completed with a lid 112 and with a corner covering box 114 which have functions in terms of appearance and protection of such second releasable engaging means 28.

The disengaging cursor 96 and the latches 88 slide in respective housings 116 and 118 obtained on the main casing 86. The latches 88 and the disengaging cursor 96 are connected to one another through the insertion of the cylindrical pins 92 in the shaped slots 98. In such a manner a horizontal displacement of the disengaging cursor 96 generates a vertical movement of the latches 88.

The system for opening/closing and engaging/disengaging the case 10 according to the invention allows the user to carry out the functions of opening/closing and engaging/disengaging, in a simple and intuitive manner. The modalities with which to carry out such functions are shown in the rest of the description.

The engagement of the case 10 to the tubular supporting structure 16, and therefore to the fixed portion of the motorcycle, can occur both with the key in the open position, and with the key 20 in the closed position. This peculiarity allows the user to engage the case 10 with the motorcycle without using the key 20 of the lock mechanism 18 in any way.

In order to perform the engagement it is necessary to bring the case 10 close to the supporting structure 16, inserting the headed pins 26 into the relative shaped recesses 24 obtained on the base portion 12. Through gravity the case 10 moves downwards, so that the headed pins 26 reach the bottom of the shaped recesses 24 (see FIG. 8A). Then it is necessary to rotate the case 10 towards the supporting structure 16 by pivoting on the headed pins 26 until the inclined teeth 90 of the latches 88 come into contact with the flanging 50 of the first metal plate 48 forming part of the tubular supporting structure 16 (FIGS. 8A-8C), or with the engagement teeth 160 of the bar 158 in die-cast metal (FIGS. 8D-8F).

By effect of the inclined plane obtained on the top of each tooth 90, the latches 88 slide downwards (see FIGS. 8B and 8E) and, once the flanging 50 or the engagement teeth 160 have been passed, under the effect of the cylindrical springs 94, return upwards, actually constraining the case 10 against the tubular supporting structure 16.

It is important to note that the latches 88 are not "key-lockable", that is to say that they cannot be locked in the closed position by the key 20 for holding the case 10. Consequently, a possible ill-intentioned person could lower them with any tool to steal the case 10. In order to avoid this drawback, the second anti-intrusion metal plate 52 is fixed to the supporting tubular structure 16.

In order to describe the disengagement step of the case 10 from the supporting tubular structure 16, we shall consider as the starting position the one in which such a case 10 is engaged to the tubular supporting structure 16 and the lock 20 is closed. In this operative condition the end portion 120 of the disengaging lever 106 is below the flange 122 (FIG. 5C) of the latch 70 of the lock mechanism 18. It is therefore impossible, in this operative condition, to move the disengaging lever 106 (see FIG. 9A). By introducing the key 20 in the vertical position inside the lock mechanism 18 and therefore by making the actual lock 58 rotate in the open position (rotation of 90°) there is the rotation of the under-lock plate 64 and, consequently, the horizontal displacement of the latch 70 inside the main body 56 until there is no more interference between the end 120 of the disengaging lever 106 and the flange 122 (see FIG. 9B).

Figure 9A:
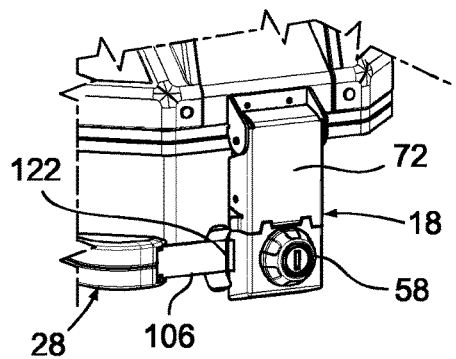
FIGS. 9A, 9B, 9C and 9D show the disengaging steps of the case of FIG. 1A with respect to the supporting structure of FIGS. 4A and 4B.
Figure 9B:
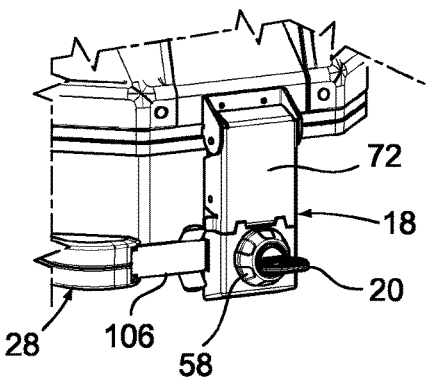
Figure 9C:
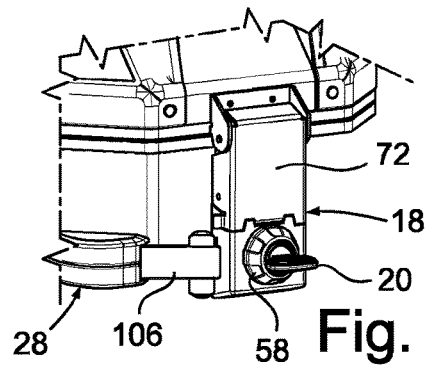
Figure 9D:
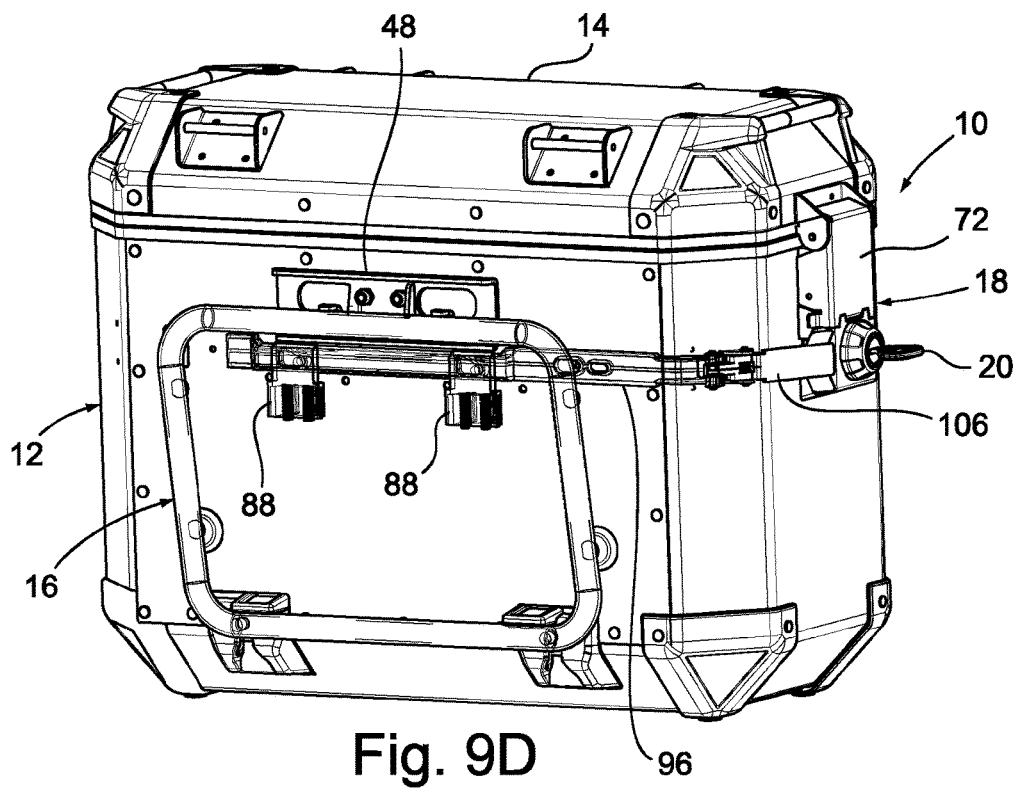
Figure 9E:
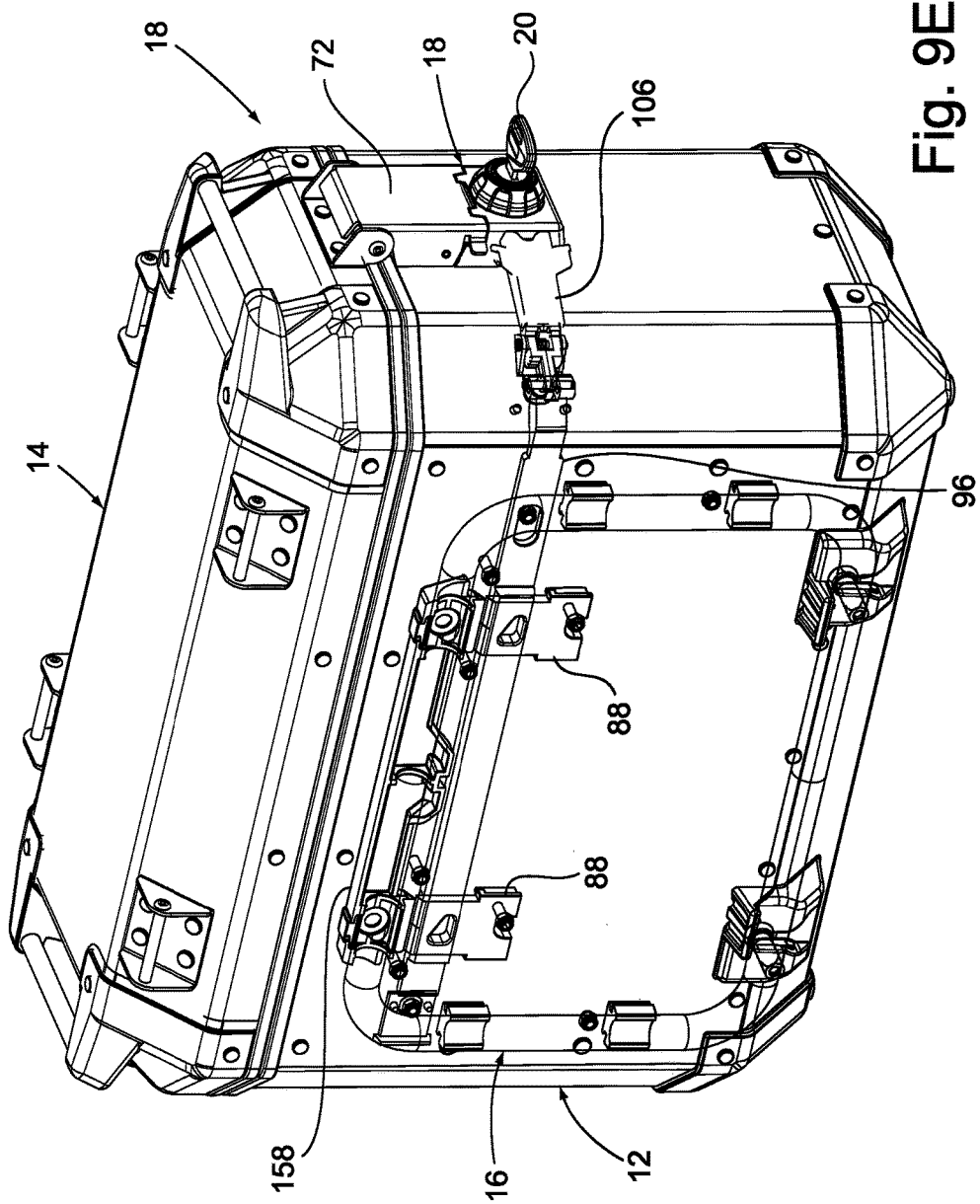
FIG. 9E shows a disengaging step of the case of FIG. 1B with respect to the supporting structure of FIGS. 4C, 4D and 4E.
Figure 10A:
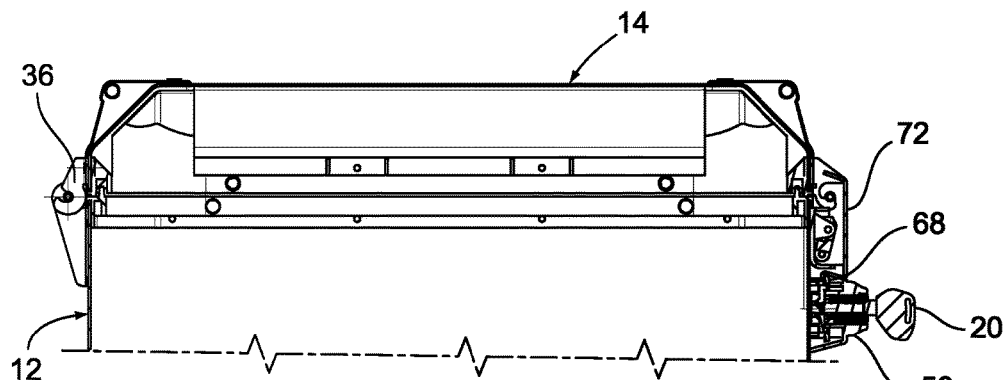
FIGS. 10A, 10B and 10C show the opening and closing steps of the case for motorcycles of FIGS. 1A and 1B.
Figure 10B:
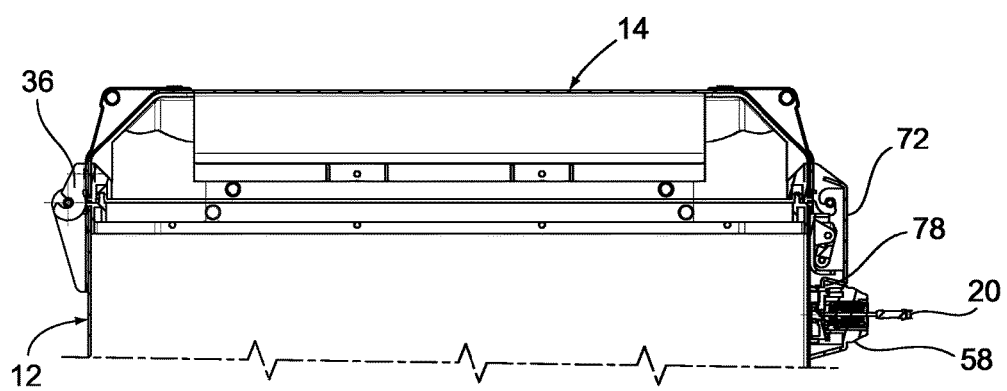
Figure 10C:
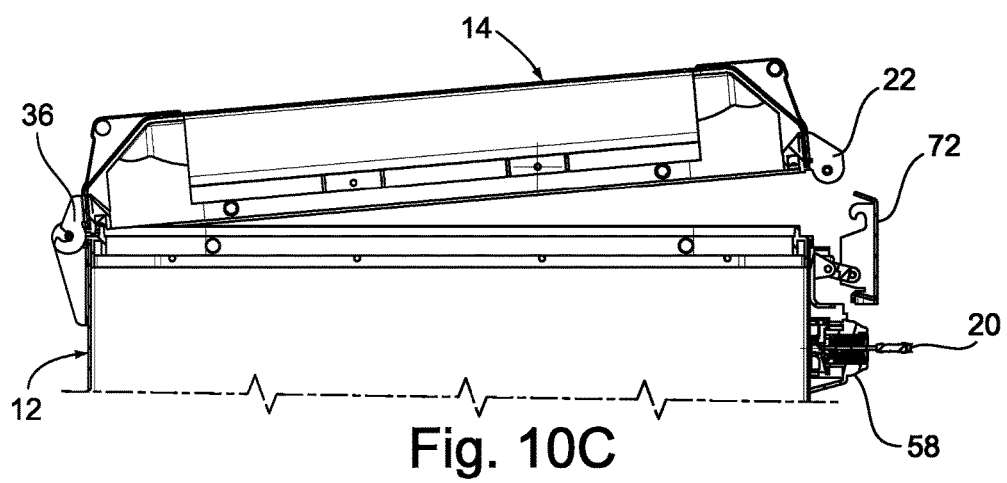

At this stage it is possible to act upon the gripping handle 108 so that, by rotating the disengaging lever 106 outwards, there is the horizontal translation of the disengaging cursor 96 and, consequently, the displacement downwards of the latches 88 until there is no more interference, between the latches 88 themselves and the flanging 50 of the first metal plate 48, or the engagement teeth 160 of the bar 158 in die-cast metal, thus allowing the case 10 to be removed from the motorcycle (see FIG. 9C).

The movement of the latches 88 is generated by the fact that their cylindrical pin 92 is in contact with the inner surface of the shaped slots 98 of the casing 86. By translating the disengaging cursor 96, the shape of the shaped slots 98 moves the latches 88 downwards (see FIG. 9D). Once the case 10 has been removed from the tubular supporting structure 16 the latches 88 return to their original position thanks to the action of the cylindrical springs 94.

Finally, in order to describe the opening and closing operations of the case 10 we shall consider as the starting condition that in which such a case 10 is closed, with the engaging tooth 72 of the lock mechanism 18 that is engaged with the first pin 32 of the cover 14, so as to keep such a cover 14 locked on the base portion 12. In this condition it is not possible to move the engaging tooth 72, since the relative tailpiece 78 is locked below one of the teeth 68 of the under-lock plate 64 (see FIG. 10A).

In order to open the case 10 the key 20 must be introduced in the vertical position inside the lock 58. Then, by making the lock 58 rotate into the open position (rotation of 90°) there is the rotation of the under-lock plate 64 until there is no more interference between the tooth 68 of such an under-lock plate 64 and the tailpiece 78 of the engaging tooth 72. It is now possible to make the engaging tooth 72 rotate and, therefore, remove the engagement with the first pin 32 of the cover 14. The cover 14 is thus free to rotate around the other pin 22 of the base portion 12, thanks to the rotation hinge 36, and consequently to open the case 10 (see FIG. 10C).

The closing of the case substantially occurs with the operations carried out in reverse with respect to what has just been described. It is thus necessary to bring the cover 14 close to the base portion 12 and manipulate the engaging tooth 72 until it engages with the first pin 32 of the cover 14 itself. It is then necessary to rotate such an engaging tooth 72 until it is brought back into its "natural" position inside the main body 56 of the lock mechanism 18 and finally rotate the key 20 in the lock 58 so as to bring it in its vertical closed position.

With reference now to FIGS. 13-18D, another embodiment of the case 10 is shown. On the side opposite the base portion 12 with respect to the side on which the lock mechanism 18 is permanently constrained, is provided a cursor mechanism 130 (FIG. 14) that, in a first operative configuration, is capable of keeping the cover 14 rotatably connected to the base portion 12 so as to allow it to be opened/closed with respect to such a base portion 12 and that, in a second operative configuration, is capable of disengaging the cover 14 with respect to the base portion 12 so as to allow it to be removed with respect to such a base portion 12 and thus improve the accessibility of the case 10. In detail, the cover 14 of the case 10 (FIG. 13) is provided, on one side, with the first pin 32 which can be engaged with the lock mechanism 18 and, on the opposite side, with a second pin 132 which can be engaged with the cursor mechanism 130.

As shown in FIGS. 15 and 16, the cursor mechanism 130 comprises a base plate 134, which is constrained to the base portion 12 of the case 10, and a bottom 136, that is fitted vertically inside the base plate 134 and fixed to it through blind rivets 138. The blind rivets 138 ensure a greater security against theft with respect to the use of common screws, since the screws can be easily removed with a screwdriver, whereas the rivets require the use of a drill and take a long time to be removed. The base plate 134 is provided with slots 150 that are suitable for holding the second pin 132 of the cover 14 in the first operative configuration of the case 10.

On the bottom 136, special housings 140 are formed, housing respective contrast springs 142 for a sliding cursor 144, which can be manually actuated. The cursor 144 is in turn provided, at the top, with recessed portions 152 that, in cooperation with the slots 150 of the base plate 134, are suitable for holding the second pin 132 of the cover 14 in the first operative configuration of the case 10.

The contrast action of the springs 142 normally keeps the cursor 144 pushed upwards. Such a cursor 144 can thus be made to slide vertically downwards by acting manually upon a special push surface thereof. Once it has been released, the cursor 144 returns into its initial position by effect of the springs 142. The cursor 144 cannot accidentally come out from the bottom 136 since such a bottom 136 is provided with a stop tooth 146 that abuts against a corresponding stop tooth 148 provided on the cursor 144.

Operatively, as shown in FIGS. 17A-17C, in order to assemble the cover 14 on the base portion 12, it is necessary to initially move the cursor 144 downwards. Subsequently, the second pin 132 of the cover 14 is inserted inside the slots 150 of the base plate 134 of the cursor mechanism 130. This last operation is carried out with the cover 14 in the inclined position. It is finally necessary to release the cursor 144 so that the relative recessed portions 152 wrap around the second pin 132. In such a way the second pin 132 of the cover 14 remains locked inside the slots 150 thanks to the action of the recessed portions 152 of the cursor 144.

In order to remove the cover 14 from the base portion 12, as shown in FIGS. 18A-18D, it is necessary to initially unlock the lock mechanism 18 with the special key 20, so as to disengage the first pin 32 of the cover 14. At this stage it is possible to make the cover 14 rotate around the second pin 132 that is opposite the first pin 32. If the case 10 has the top box B above it, such a rotation could also be by a small amount, that is to say of a few degrees (8° maximum), so that there is no interference between the cover 14 and the bottom of the top box B.

Once the rotation of the cover 14 around the second pin 132 has been obtained, it is possible to push the cursor 144 downwards until such a second pin 132 is disengaged from the recessed portions 152 of the cursor 144. By moving the cover 14 outwards from the case 10 (FIG. 18D) it is finally possible to extract the second pin 132 from the slots 150 and, therefore, definitively remove such a cover 14.

It should be noted that when the case 10 is closed, that is to say when the first pin 32 of the cover 14 is locked by the lock mechanism 18, the cover 14 cannot be removed, since it is not capable of translating so as to allow the extraction of its second pin 132 from the slots 150 of the base plate 134. In order to further improve the resistance of the case 10, the second pin 132 is made integral with the cover 14 through a piece 154 provided with a flange 156, which is obtained integral with such a piece 154 (FIG. 16), which partially covers such a second pin 132 and makes it more difficult for ill-intentioned people to act with thieving tools on the second pin 132 itself.

It has thus been seen that the case for motorcycles and the relative system for opening/closing and engaging/disengaging it with respect to a fixed structure of the motorcycle according to the present invention achieve the purposes previously highlighted. Indeed, thanks to the rotation of the single key with which the lock mechanism of the case is provided, it is possible for the user to decide whether to open the case or disengage it from the motorcycle.

The case for motorcycles of the present invention thus conceived can in any case undergo numerous modifications and variants, all covered by the same inventive concept; moreover, all the details can be replaced by technically equivalent elements. In practice the materials used, as well as the shapes and sizes, can be any according to the technical requirements.

The scope of protection of the invention is thus defined by the attached claims.

The invention claimed is:

1. A case for motorcycles comprising a base portion, a cover, hinged to said base portion in order to pass from an open configuration to a closed configuration of the case and vice versa, and a supporting structure, constrainable on one side to the base portion and, on the opposite side, to a fixed structure of the motorcycle, wherein on said base portion a lock mechanism with a key is permanently constrained, said lock mechanism being operatively connected to the cover, wherein the case comprises first releasable engaging means between the base portion and the cover and second releasable engaging means between said base portion and the supporting structure, wherein said second releasable engaging means are made integral to the base portion, wherein both the first engaging means, and the second engaging means are simultaneously released by the key of the lock mechanism in order to selectively obtain the opening of the cover with respect to the base portion and the disengagement of said base portion with respect to the supporting structure, and wherein said second releasable engaging means comprise a main casing, fixed to the base portion, wherein at least one latch is slidably inserted, on which a cylindrical pin and an inclined tooth, which is engageable with said supporting structure in order to perform the engagement of said base portion on said supporting structure, are integrally obtained.

2. The case according to claim 1, wherein on a predefined portion of the supporting structure, a first plate is made integral, on which a flanging is obtained, which cooperates with said second releasable engaging means in order to allow said base portion to engage on said supporting structure, and a second plate is also made integral on the predefined portion of the supporting structure, acting as an anti-intrusion barrier in order to protect said second releasable engaging means from possible theft attempts of the case.

3. The case according to claim 1, wherein on a predefined portion of the supporting structure a bar is made integral, on which one or more engagement teeth are integrally formed, said teeth cooperating with said second releasable engaging means in order to allow the engagement of said base portion on said supporting structure, wherein on said bar, at each tooth, one or more caps are fixed, acting as an anti-intrusion barrier for protecting said second releasable engaging means from possible theft attempts of the case.

4. The case according to claim 3, wherein the case comprises an engagement indicator device which allows the user to understand whether the engagement of the case to the relative supporting structure has occurred in the correct manner, said engagement indicator device being made up of one or more indicating components, enclosed between the bar and the respective caps and capable of rotating with respect to the supporting structure, said one or more indicating components being activated by said second releasable engaging means so as to selectively show the user a portion provided with two separate indicating signals, a first signal indicating the condition in which the case is not engaged with the relative supporting structure and a second signal indicating the condition in which the case is correctly engaged with the relative supporting structure.

5. The case according to claim 1, wherein the case comprises a plurality of rubber buffers applied to the supporting structure or to the base portion, said rubber buffers, in she engaged configuration of the case, going into contrast and deforming against said base portion or against said supporting structure for zeroing the assembly clearances and thus avoiding annoying vibrations and noise for the user.

6. The case according to claim 1, wherein said main casing comprises at least one cylindrical spring acting by compression, which allows the movement in the vertical direction of said at least one latch.

7. The case according to claim 1, wherein said main casing a disengaging cursor is slidably inserted, on which at least one shaped slot and at least one eye are formed, said disengaging cursor and said at least one latch sliding in respective housings obtained on the main casing and being connected to each other by the insertion of said cylindrical pin in said at least one shaped slot, so that a horizontal displacement of the disengaging cursor generates a vertical movement of said at least one latch.

8. The case according to claim 7, wherein said second engaging means further comprise a fixing bracket, fixed to the base portion and provided with two first through-holes, and a disengaging lever, provided with a gripping handle on one side and with two pairs of second through-holes on the opposite side, said disengaging lever being attached in an articulated manner to said fixing bracket, by means of a first shaft inserted through said first through-holes and a pair of said second through holes, and being then connected to said disengaging cursor through a second shaft inserted through said at least one eye and the other pair of said second through-holes so that, by acting on the gripping handle and rotating the disengaging lever outwards, the horizontal translation of the disengaging cursor is generated and, consequently, the displacement downwards of the latches until the interference between said latches and said supporting structure is released in order to remove said base portion from said supporting structure.

9. The case according to claim 1, wherein on the base portion at least one shaped recess is made integral, suitable for inserting into its inside at least one corresponding headed pin obtained on the lower portion of the supporting structure in order to support said base portion on said supporting structure.

10. The case according to claim 1, wherein said lock mechanism is made up of a main body wherein a lock actuatable by said key and constrained to an under-lock plate provided with at least one tooth is inserted, obtaining the same rotation on said underlock plate by rotating said key.

11. The case according to claim 10, wherein said rotating under-lock plate an eccentric disk is integrally obtained, which couples with a latch, the rotation of the key and, consequently, the rotation of the assembly made of the lock and of the under-lock plate generating, by means of the action of said eccentric disk, the horizontal linear displacement of the latch in order to selectively engage or disengage said, second releasable engaging means.

12. The case according to claim 10, wherein said lock mechanism further comprises a hinge engaging tooth which forms the first releasable engaging means between the base portion and the cover and whereon two slots are obtained, which couple with a first pin fixed to said cover.

13. The case according to claim 12, wherein the hinge engaging tooth is rotatably connected to the main body of the lock mechanism through a connecting rod provided with two parallel pins, one pin being integral with said engaging tooth and the other pin being integral with said main body so that, thanks to said connecting rod, the engaging tooth can roto-translate from the closed position to the open position of the lock mechanism.

14. The case according to claim 12, wherein on the hinge engaging tooth two protrusions are further obtained, in order to allow the gripping by the user in the opening/closing steps of the cover, and a tailpiece blockable below said at least one tooth of the under-lock plate, so as to prevent the movement of said hinge engaging tooth in the closed configuration of the case.

15. The case according to claim 12, wherein on the opposite side of the base portion with respect to the side on which the lock mechanism is permanently constrained, is provided a cursor mechanism which, in a first operative configuration, is capable of keeping the cover rotatably connected to the base portion so as to allow the opening/closing with respect to said base portion and, in a second operative configuration, is capable of decoupling the cover with respect to the base portion so as to allow the cover to be removed with respect to said base portion and thus improve the accessibility of the case.

16. The case according to claim 15, wherein the cover, on the opposite side with respect to that on which said first pin is fixed, is provided with a second pin which is engageable with the cursor mechanism.

17. The case according to claim 16, wherein the cursor mechanism comprises a base plate, constrained to the base portion and provided with slots suitable for holding said second pin in said first operative configuration.

18. The case according to claim 17, wherein the cursor mechanism further comprises a bottom, fitted vertically inside the base plate and fixed to the base plate through blind rivets, said bottom having special housings obtained thereon, housing respective contrast springs for a sliding cursor, provided, at the top, with recessed portions which, in cooperation with the slots, are suitable for holding said second pin in said first operative configuration.

19. The case according to claim 18, wherein the bottom is provided with a stop tooth which contrasts with a corresponding stop tooth provided on the cursor, so as to prevent the cursor from accidentally coming out from said bottom.

20. The case according to claim 16, wherein said second pin is made integral with the cover through a piece provided with a flange, formed integrally from said piece, which partially covers said second pin and makes it more difficult for people with bad intentions to act upon said second pin with tools for theft.

* * * * *